(12) United States Patent
Ingalsbe et al.

(10) Patent No.: US 7,304,588 B2
(45) Date of Patent: Dec. 4, 2007

(54) MONITORING TECHNOLOGY

(75) Inventors: Daryl Ingalsbe, Blair, NE (US); Greg Molenaar, New London, MN (US); Jim Fangmeier, Paynesville, MN (US); Luke Smith, Richmond, MN (US); Jonathan Meed, Paynesville, MN (US); Douglas H. Ferguson, Eden Valley, MN (US); Tim Siegfried, Atwater, MN (US)

(73) Assignee: Independent Technologies, Inc., Omaha, NE (US)

( * ) Notice: Subject to any disclaimer, the term of this patent is extended or adjusted under 35 U.S.C. 154(b) by 409 days.

(21) Appl. No.: 10/901,529

(22) Filed: Jul. 29, 2004

(65) Prior Publication Data

US 2006/0036515 A1    Feb. 16, 2006

(51) Int. Cl.
*G08B 71/00*    (2006.01)
(52) U.S. Cl. ............ 340/870.16; 702/50; 702/55; 73/61.59; 73/313; 340/870.07
(58) Field of Classification Search ........... 340/539.22, 340/870.11, 870.16, 870.07; 73/61.59, 313; 702/50, 55
See application file for complete search history.

(56) References Cited

U.S. PATENT DOCUMENTS

| | | | | |
|---|---|---|---|---|
| 5,487,300 | A * | 1/1996 | Brackett et al. | 73/61.59 |
| 5,619,560 | A * | 4/1997 | Shea | 379/106.04 |
| 6,208,266 | B1 | 3/2001 | Lyons et al. | |
| 6,336,362 | B1 * | 1/2002 | Duenas | 73/313 |
| 6,678,255 | B1 * | 1/2004 | Kuriyan | 370/310 |
| 6,922,144 | B2 * | 7/2005 | Bulin et al. | 340/539.22 |
| 2001/0032506 | A1 * | 10/2001 | Keller | 73/313 |
| 2006/0015543 | A1 * | 1/2006 | Humphrey | 707/202 |
| 2006/0142974 | A1 * | 6/2006 | Scott et al. | 702/188 |
| 2006/0243347 | A1 * | 11/2006 | Humphrey | 141/95 |

OTHER PUBLICATIONS

Squibb Taylor, Inc. The Stationary Tank Monitor. On information and belief, published at least by Jan. 23, 2003 via Internet.
Robertshaw Controls Company, in Maryville TN. Centeron Distribution Management System. On information and belief, published at least by Jan. 13, 2003 via Internet.
cTankgauge, LLC. Product Literature—Ultrasonic, Pressure and Capacitance Monitors and More. On information and belief, published at least by Feb. 5, 2003 via Internet.

(Continued)

*Primary Examiner*—Albert K. Wong
(74) *Attorney, Agent, or Firm*—Skinner & Associates

(57) ABSTRACT

An apparatus for monitoring an article or system, particularly an LP or propane tank, includes a transmission unit, a base unit and a host unit. The transmission unit is disposed on or near the article or system and detects at least one parameter related to the article or system and send information related to the detected parameter. The base unit is disposed at a predetermined location remote from the article or system. The base unit receives information related to the detected parameter from the transmission unit. The host unit is disposed at a location remote from the base unit and the transmission unit. The host unit receives information related to the detected parameter from the base unit for management purposes. A method of monitoring an article or system such as a fuel tank is also disclosed.

20 Claims, 22 Drawing Sheets

OTHER PUBLICATIONS

Sentrymetering.Com. Sentry Metering Systems LPG Products. On information and belief, published at least by Jan. 14, 2003 via Internet.

Sentrymetering.Com. Sentry Automatic Data Collection System User Manual. On information and belief, published at least by Jan. 14, 2003 via Internet.

Sensor Systems, Armagh N. Ireland. The LPG Watchman. On information and belief, published at least by Apr. 24, 2003 via Internet.

Sensor Systems, Arnagh N. Ireland. Tank Signal System. On information and belief, published at least by Apr. 24, 2003 via Internet.

* cited by examiner

| FIG. 7B-1 |
| FIG. 7B-2 |
| FIG. 7B-3 |

FIG. 7B a b c d e f g

MONITORING TECHNOLOGY

37 C.F.R. §1.71 (e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND

1. Field

The present invention relates, generally, to metering apparatus and methods. More particularly, the invention relates to remote electronic metering apparatus and methods. Most particularly, the invention relates to a system, apparatus and method for remotely monitoring the status and use of a liquid propane (LP) storage tank. The techniques of the invention can also be used in other fields.

2. Background Information

Existing technology, in general, includes apparatus and methods for metering various systems, including electronic and mechanical systems.

U.S. Pat. No. 6,208,266 issued Mar. 27, 2001 to Lyons et al. (assigned to Scientific Telemetry Corporation) for Remote Data Acquisition and Processing System discloses an optical imaging device for generating computer-readable image data of a visual representation, generated by a utility meter, of utility operation-related data.

This technology is believed to have significant limitations and shortcomings. For these and other reasons, a need exists for the present invention.

All US patents and patent applications, and all other published documents mentioned anywhere in this application are hereby incorporated by reference in their entirety.

BRIEF SUMMARY

The present invention provides a metering apparatus and method which are practical, reliable, accurate and efficient, and which are believed to fulfil a need and to constitute an improvement over the background technology.

In one aspect, the invention relates to an apparatus for monitoring an article or system, comprising:
  (a) a transmission unit adapted to be disposed on or near the article or system, the transmitter being constructed and arranged to detect at least one parameter related to the article or system and send information related to the detected parameter;
  (b) a base unit adapted to be disposed at a predetermined location remote from the article or system, the base unit being constructed and arranged to receive information related to the detected parameter from the transmission unit; and
  (c) a host unit adapted to be disposed at a location remote from the base unit and the transmission unit, the host unit being constructed and arranged to receive information related to the detected parameter from the base unit.

In another aspect, the invention relates to a method of monitoring an article or system, comprising:
  (a) detecting at least one parameter related to the article or system at the location of the article or system;
  (b) sending information related to the detected parameter to a predetermined first location remote from the article or system, and
  (c) sending the information related to the detected parameter from the first remote location to a second location remote from the article or system and from the first remote location.

The features, advantages, benefits and objects of the invention will become clear to those skilled in the art by reference to the following description, claims and drawings.

BRIEF DESCRIPTION OF THE SEVERAL VIEWS OF THE DRAWING

The present invention, and the manner and process of making and using it, will be better understood by those skilled in the art by reference to the following drawings.

DETAILED DESCRIPTION

Figure 1:
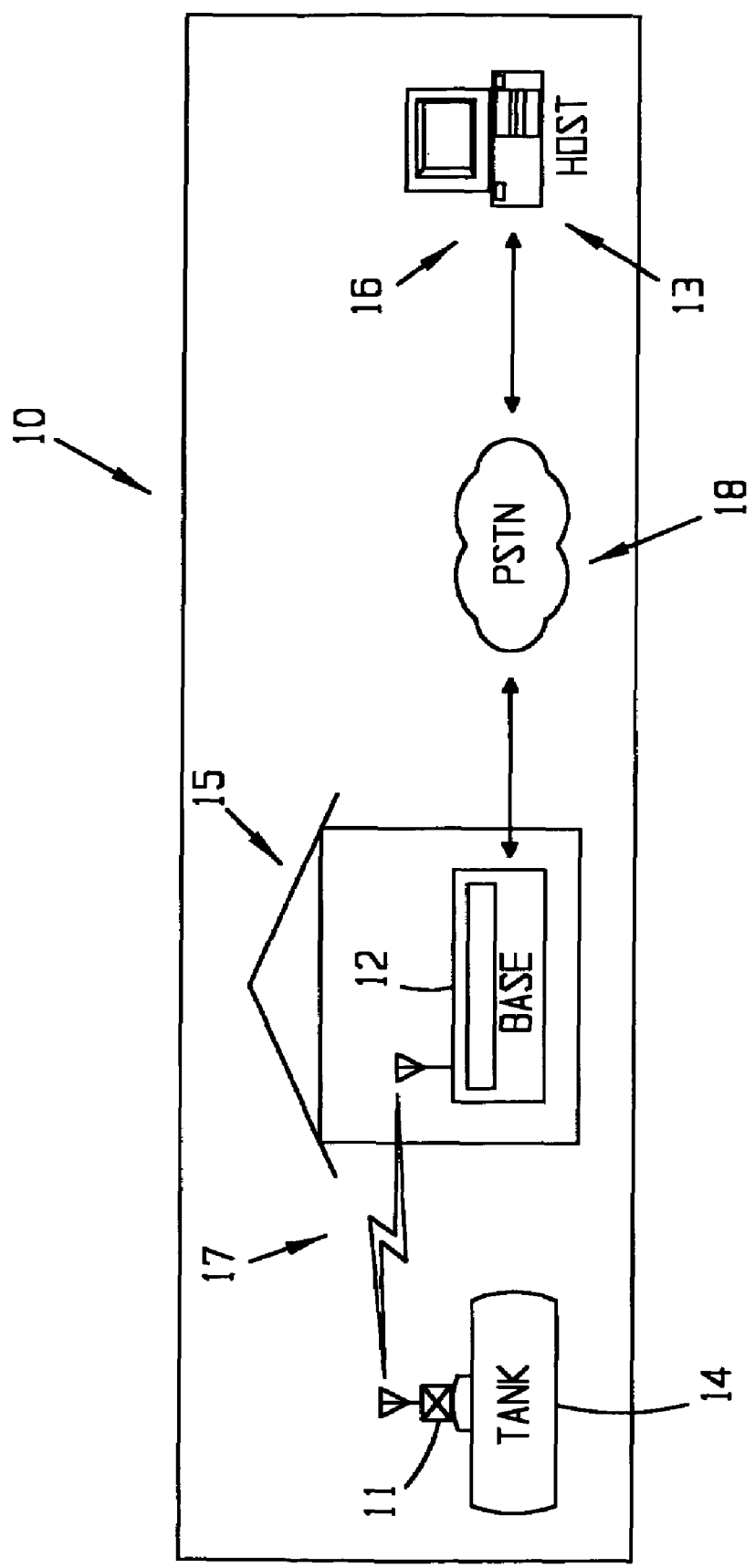
FIG. 1 illustrates basic components of one embodiment of the tank management metering system of the present invention.

The invention includes a monitoring and management system, particularly a propane fuel tank or route management system. General benefits of the system from the perspective of the propane or other distributor include that it enhances the efficiency of a propane fuel distributor's delivery operation, maximizes the number of gallons of fuel delivered per man-hour of delivery time, and lowers the rate of unscheduled deliveries due to empty fuel tanks. General benefits of the system from the perspective of the customer include helpful information, convenience, ease of use and security.

The drawing Figures show embodiments of the system of the present invention which are intended to be illustrative and not to be exhaustive or limit the invention to the exact forms disclosed. The embodiments are chosen and described so that persons skilled in the art will be able to understand the invention and the manner and process of making and using it.

1. System Overview

Referring to FIG. 1, an embodiment of the basic management system 10 comprises, in general, a transmitter unit 11, a base unit 12, and a host unit 13. The transmitter unit or transmitter 11 is installed at the location of the article or system 14 being monitored and managed, for example a propane gas or other fuel or material tank 14 (utility tank). The base unit or base 12 is installed inside the premises 15 served by the utility tank 14, for example the fuel customer's residence, business or other facility. The host system or host 13 is located at the facility or other point 16 from which propane delivery is managed, for example a propane gas distributor's facility. Such facility is almost always remotely located with respect to the propane customer's premises 15. The transmitter 11 is preferably communicatively connected to the base 12 via a wireless connection 17. The base 12 is preferably communicatively connected to the host 13 via a telephone network 18.

The transmitter 11 monitors one or more physical paramaters or characteristics of the utility tank 14 or other article or system, for example fuel level and transmits information about the parameter to the base unit 12 for display and processing. Transmission is typically done on an as needed basis. The base 12 permits the premises owner or occupant, and fuel customer, to quickly and easily observe fuel level from the comfort of the premises. Other information such as time, interior and exterior temperature, fuel or other product related information, and the like may also be provided. The base 12 also transmits the information received from the transmitter to the host 13. This permits the fuel supplier to monitor the and provide the fuel customer with complete, accurate and fast fuel services efficiently.

2. System Transmitter

Figure 3:
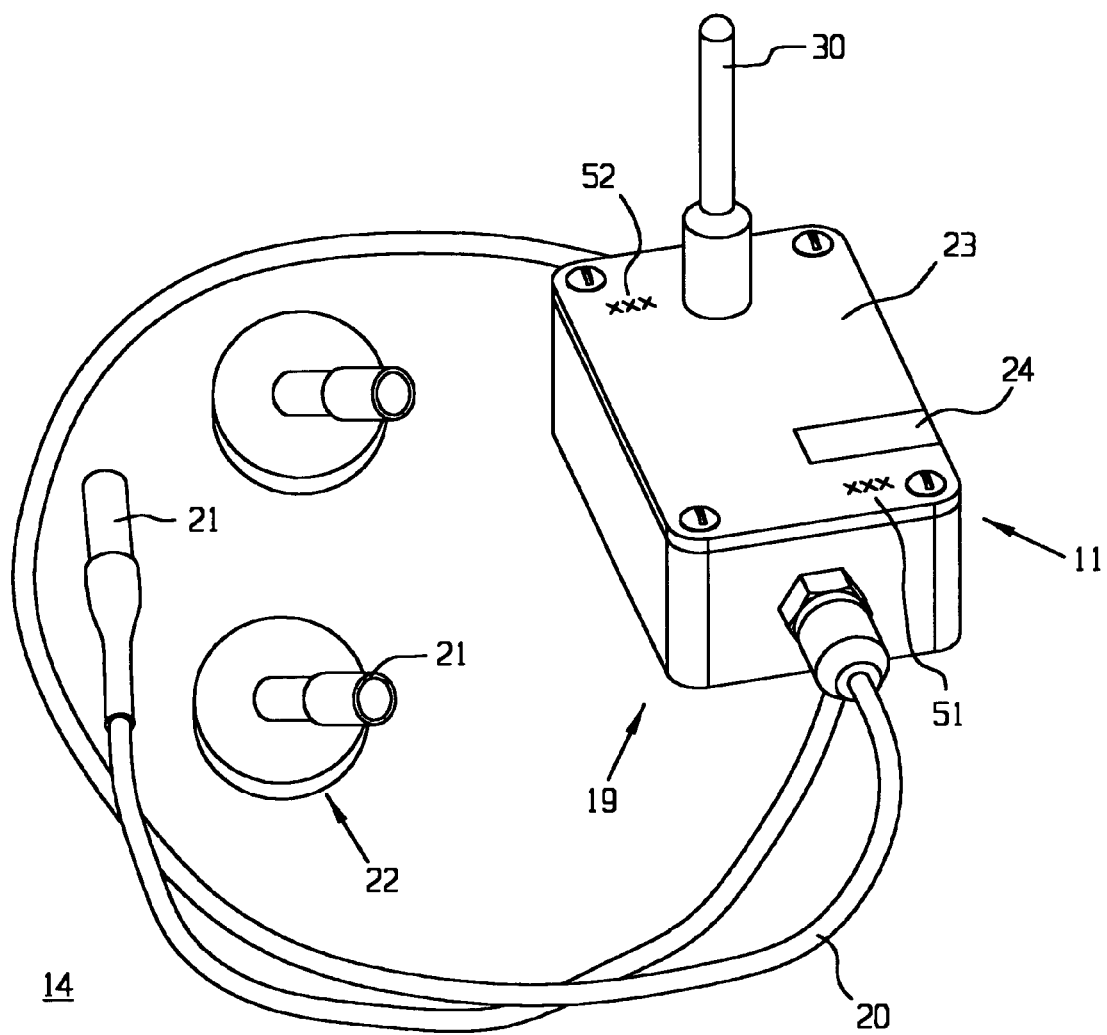
FIG. 3 is a schematic diagram of an embodiment of the transmission unit of the system.
Figure 5:
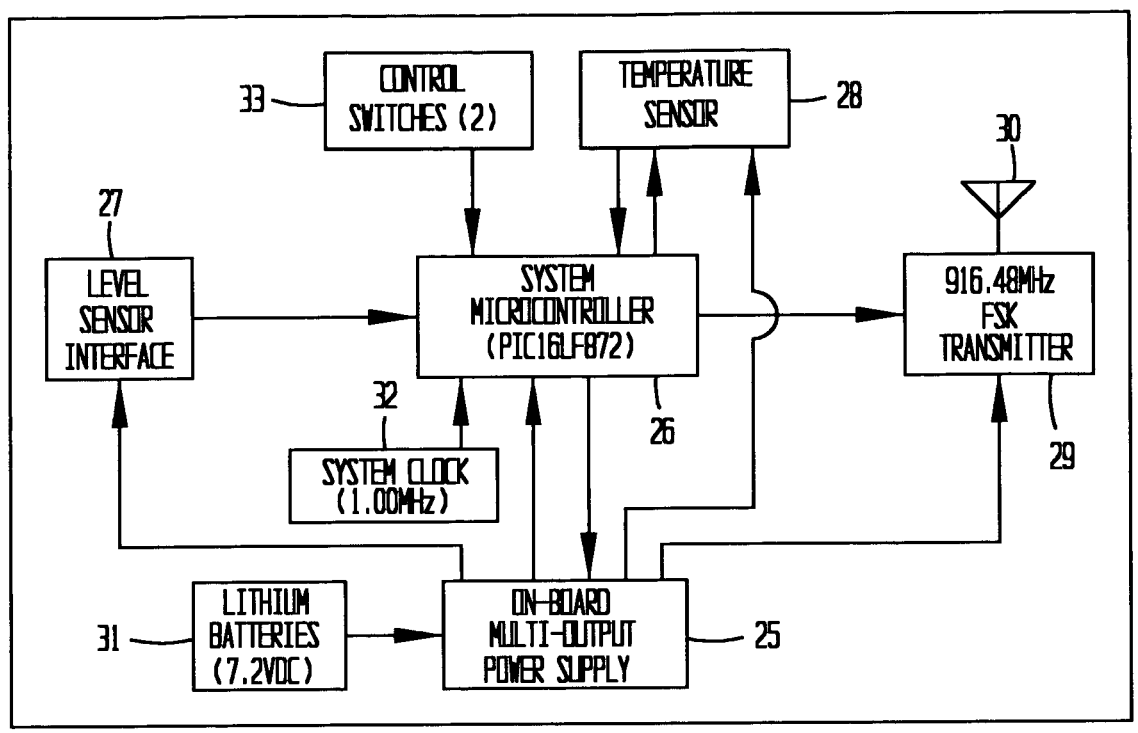
FIG. 5 is a schematic diagram of principal components of the transmission unit.
Figure 6:
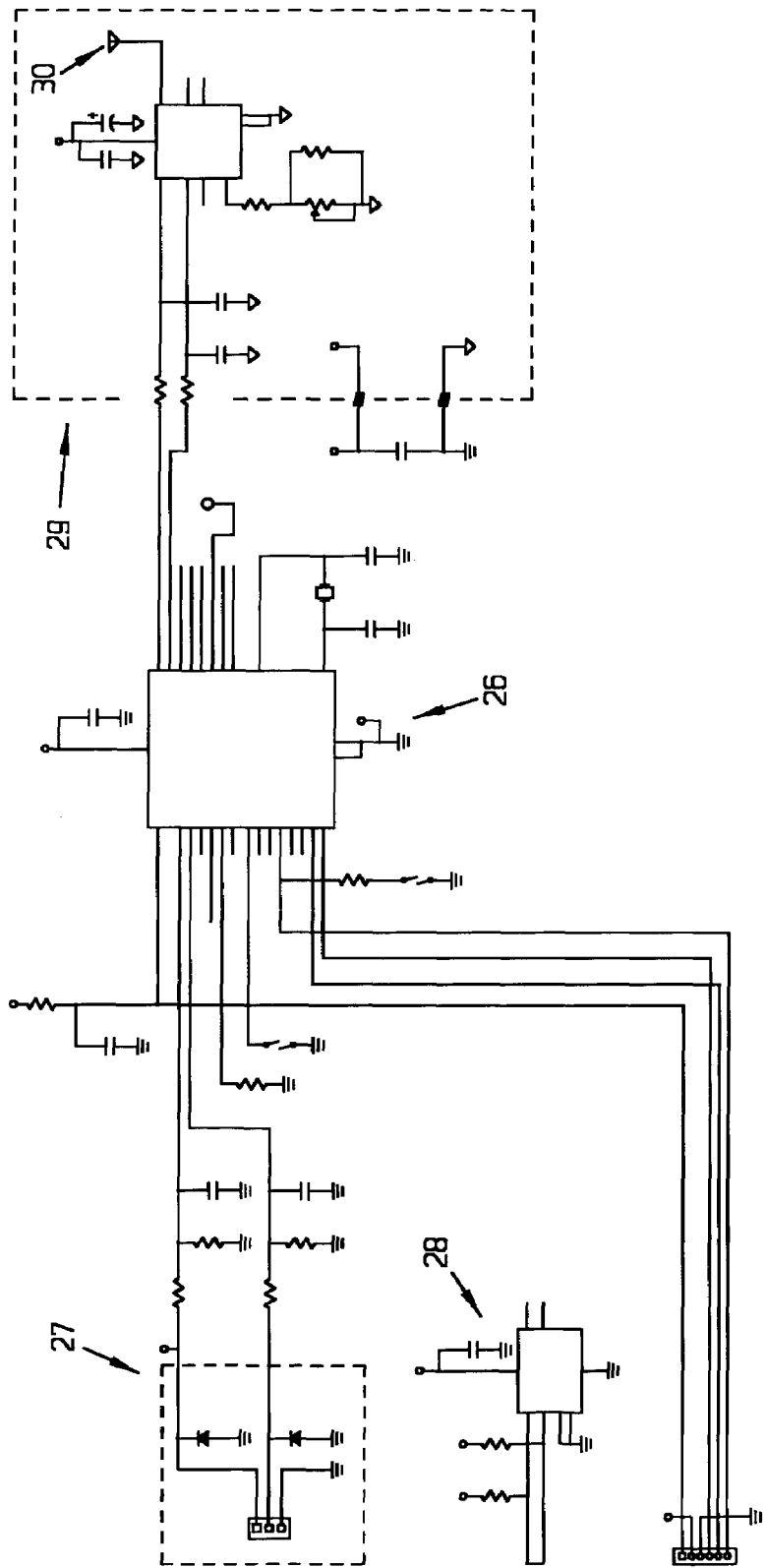
FIG. 6 is a schematic diagram of detailed components of the transmission unit.
Figure 6:
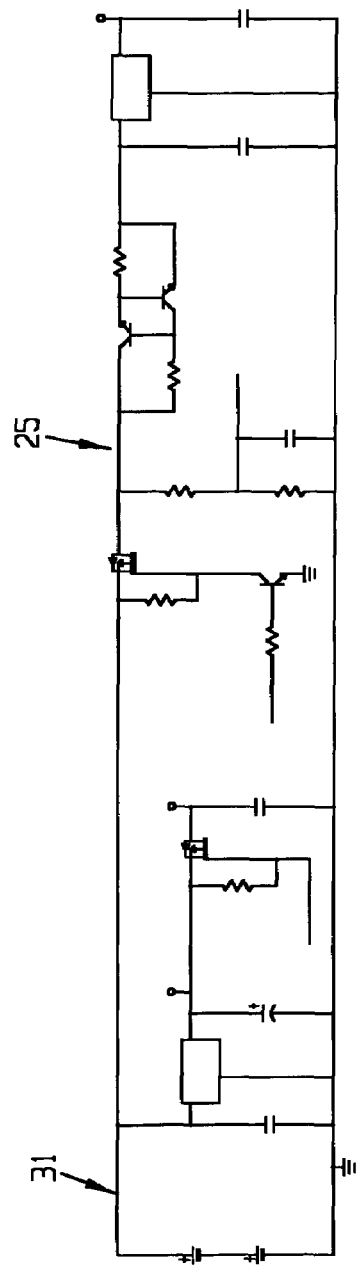

Referring also to FIG. 3, the tank management system 10 transmitter 11 is installed on the outside of the propane tank 14 its contents, and/or its environment which are being monitored. The transmitter 11 monitors the level and temperature of propane fuel in the tank 14 and reports this level to the tank management system base unit 12 via the wireless connection 17, for example a radio frequency (RF) link Referring also to FIGS. 5 and 6, the transmitter 11 generally comprises a mounting system 19, a power supply circuit 25, a system microcontroller 26 connected to the power supply circuit 25, a level sensor input and measurement circuit 27 connected to the microcontroller 26 and to the power supply circuit 25, a temperature sensing and measurement circuit 28 connected to the microcontroller 26 and to the power supply circuit 25, and an RF transmitter module 29 which is connected to the microcontroller 26, the power supply circuit 25, and to an antenna 30. The transmitter 11 also preferably comprises a system clock 32 connected to the microcontroller 26. The transmitter 11 is preferably powered by non-rechargeable batteries 31, preferably a pair of 3.6VDC lithium batteries, connected to the power supply circuit 25. This type of battery has a high energy density and a relatively high cell voltage, and can operate over a very wide temperature range. The transmitter 11 preferably uses a simple linear voltage regulation scheme to power the internal circuitry at preferably approximately 5VDC and 10 mADC max. Control switches 33 are connected to the microcontroller 25.

Referring again to FIG. 3, the mounting system 19 preferably comprises a housing 23 which securely contains electronic components of the transmitter 11 and mounts to the tank 14 via magnets. The antenna 30 extends from the housing 23. Cable 20 (preferably 22 AWG, 3 conductor, PVC jacketed and between approximately 30 inches and 3 feet long) also extends from the housing 23 and terminates at a gauge interface sensor 21, which is connectable to a standard Rochester gauge which is commonly present on the vast majority of propane tanks in use in the US. The sensor 21 is a hall-effect type device which mates with a standard head 22 of the Rochester gauge and tracks the rotational position of the magnet present in the gauge head 22.

Referring again to FIGS. 5 and 6, the microcontroller 26 is preferably a PIC16LF872 8-bit microcontroller. It has internal FLASH, RAM and EEPROM memories, an internal in-circuit serial programming hardware, and internal 10-bit ADC for tank level and battery voltage measurements, an internal 12 C bus for communication with the temperature sensor 28, an general purpose I/O for control and communication, and a 1.0 MHz ceramic resonator system clock 31. The temperature sensor 28 is preferably an internal Maxim MAX6335 temperature sensor IC with 0.0625 C resolution over a range of −55 to 150 C. It has a 12 C bus interface for communication with the microcontroller 26. Level sensor 27 is a hall-effect sensor. Power to the level sensor 27 is preferably regulated to 5VDC. Capacitance at sensor 27 interface is 0.1 uf. The sensor 27 is powered on for 5.3 mS once every minute. The wireless transmitter 29 is preferably a Linx Technologies ES Series 916.48 MHz FSK transmitter 29 module. The antenna 30 is preferably a quarter wave whip antenna. Data transmissions are typically less than 150 mS in duration.

Referring also to FIG. 3, in general the transmitter 11 microcontroller 26 monitors inputs and sends data via the RF transmitter 29 module. The microcontroller 26 preferably uses power management techniques (described below) to maximize battery 31 life. The transmitter 11 obtains tank level input from an external sensor mounted to the tank gauge 22. The transmitter 11 powers the sensor and measures its output to determine tank 14 level. Internal transmitter case temperature is preferably measured and reported to help monitor ambient conditions. The internal RF transmitter module 29 and external antenna 30 to send data to the base unit 12 over a wireless link. The internal RF transmitter 29 preferably operates in the 902-928 MHz ISM band. Alternatively, the 260-470 MHz or other bands may be used. The transmitter 11 may also have the capability to sense tank 14 pressure. The tank management system transmitter 11 has several operating modes. In Run Mode, the tank management system transmitter 11 spends most of its time sleeping. It will periodically wake up, measure the tank 14 level, temperature and battery voltage, send a normal data packet to the base unit 12 and return to sleeping. The transmitter 11 preferably has an adaptive transmission rate (ATR) which enables the transmitter 11 to transmit as rapidly as is necessary to keep the base unit 12 up to date with the condition of the tank 14. Preferably, transmission occurs only when the fuel level in the tank 14 changes. This ATR feature enables the transmitter 11 to preserve battery 31 power and lengthen battery 31 life, and at the same time ensures that tank 14 information is up to date. Also, the ATR feature gives the user the ability to see relatively short time period changes in fuel level or other parameters that may not have changed for long periods of time.

In initialization mode, which is used at system 10 installation time to initialize the transmitter 11 with any base units 12 within communication range, the transmitter 11 will transmit an initialization data packet approximately every 15 seconds. The transmitter 11 will revert to run mode if left in initialization mode for over 30 minutes. The information contained in the packet is used to make a nearby base unit 12 aware of the characteristics of the transmitter 11. The reception of initialization packets by the base unit 12 is indicated on the base unit's 12 display and can be used to verify the integrity of the wireless link 17.

In particular, when configured for normal operation, the transmitter 11 spends most of its time in a low power sleep mode. Once per minute, the transmitter 11 will wake up and measure the internal battery 31 voltage and tank level sensor 27. If the tank 14 level has changed or if a 4-hour timeout has expired, the transmitter 11 will measure the current temperature. Once all measurements are completed, the transmitter 11 will send a data packet via the 916.48 MHz wireless link 17. A normal data packet contains the following information:

Serial synchronization bytes.
Packet size in bytes.
Application (LPG, heating oil, water, temperature, etc.).
Transmitter type.
Transmitter version.
Transmitter serial number (24-bit).
Tank number (configurable from 1 to 6).
Transmitter status byte.
Decompression, Fill, Low Level and Main event counters.
Battery voltage.
Percent decrease during last decompression event.
Percent increase during last fill event.
Current tank level in percent.
Current temperature inside transmitter enclosure.
Number of minutes since last fill event.
CRC16 used to check data packet integrity.

The transmitter 11 has four basic operating modes which are selected using external programming magnets 24 activating internal reed switches. In OFF Mode: (magnet 24 in OFF position 51) the transmitter 11 is in a low power sleep mode. In INIT Mode: (magnet 24 in INIT position 52) the transmitter 11 sends an initialization packet every 15 seconds. Initialization packets are used to synchronize the transmitter 11 to a base unit 12. After 30 minutes, transmitter 11 will timeout and switch to NORMAL mode. NORMAL Mode: (magnet 24 in neither position) is a normal operating mode. The transmitter 11 measures tank 14 level once per minute and the transmitter 11 communicates via wireless link 17 once every four hours or immediately if tank 14 level changes. In TANK Mode: (magnet 24 in both OFF 51 and INIT 52 positions) internal tank number is changed every 6 seconds. The user removes magnets 24 as soon as transmitter 11 sends desired tank number. The user can monitor current tank number with WESROC RMS Handheld Monitor 60 (see FIG. 15) or base unit 12. After 30 minutes, transmitter 11 will timeout and switch to NORMAL mode.

In addition to transmitting normal level and temperature measurements, the transmitter 11 will qualify a number of special events and will transmit data related to those events. If a new event is qualified while transmitting data related to a previous event, the status flag is set for the new event and the transmissions continue until each event has been transmitted the required number of times. Regarding Fill Events, the transmitter 11 monitors increases in tank 14 level closely. When an increase occurs, the transmitter 11 begins looking for further increases. If no further increases are detected within 15 minutes, the transmitter 11 will consider any potential fill event to have concluded. If the total increase has reached at least 5%, the transmitter 11 will qualify a fill event and begin transmitting this event to a base unit 12. The fill event will be transmitted once every thirty minutes for four hours. Regarding Decompression Events, if the transmitter 11 measures a decrease in tank 14 level of at least 10% in one hour, it will consider it a decompression event and will transmit the event to the base unit 12. The decompression event will be transmitted once every 30 minutes for 4 hours. Regarding Low-Level Events, if the transmitter 11 measures a tank 14 level of 10% or less, it will consider the tank 14 to be low and will transmit the event to the base unit 12. The low-level event will be transmitted once every 30 minutes for 4 hours. A low-level status flag will be set during subsequent normal transmissions for as long as the condition is true.

Figure 8:
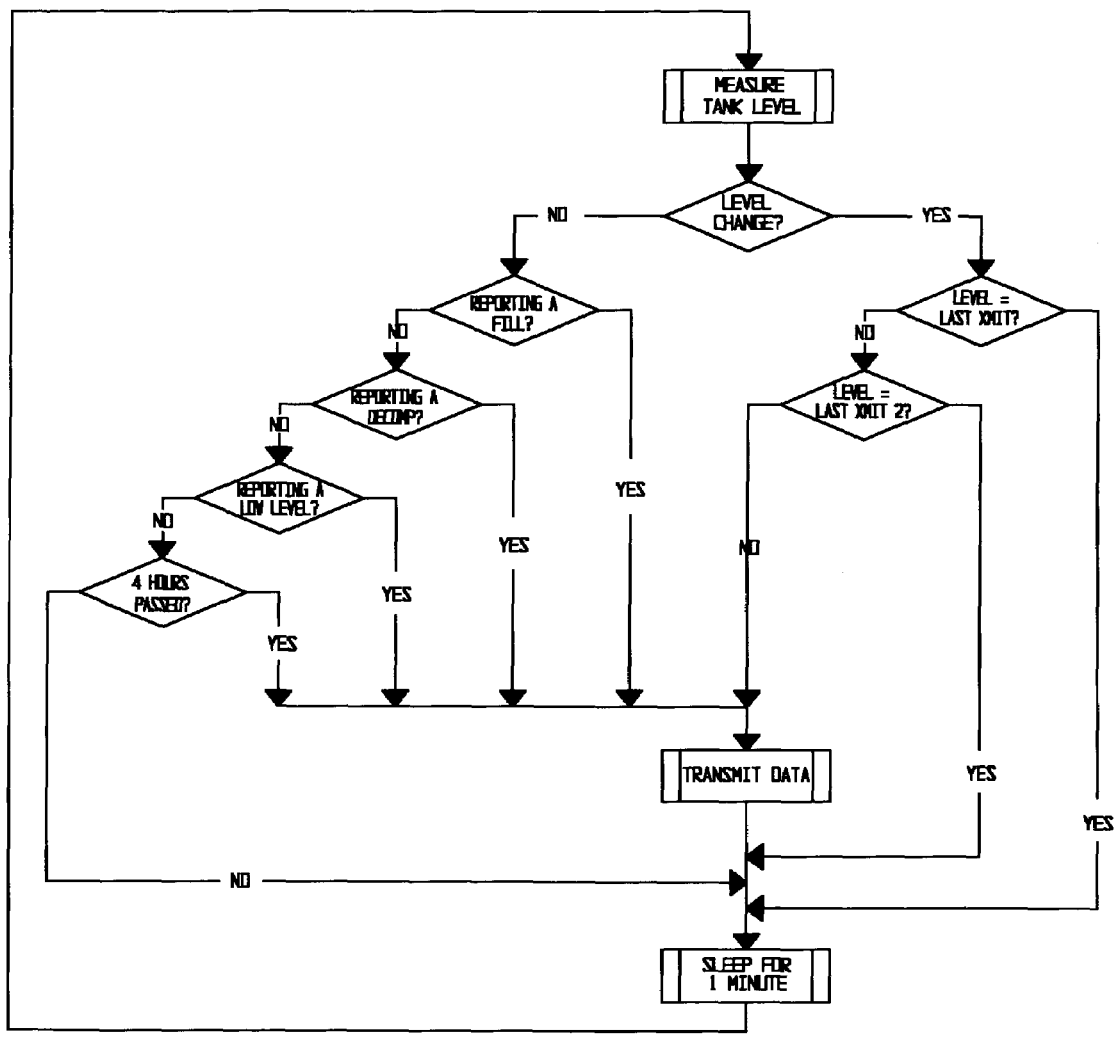
FIG. 8 is a flow chart illustrating the adaptive transmission rate process of the invention.

Referring to FIG. 8, the adaptive transmission rate (ATR) enables the transmitter 11 to quickly respond to changes in tank 14 level and still have very low power consumption. This provides close monitoring of the tank 14 during periods of high usage or tank 14 fill events. Low power consumption provides long battery 31 life. Tank 14 level is measured in percent full once per minute. Level is transmitted if it has changed since the last measurement. An anti-dither algorithm is used to prevent transmission if tank 14 level continuously toggles between two adjacent percentages. A keep alive transmission is sent if the level has not changed in four hours.

Figure 9:
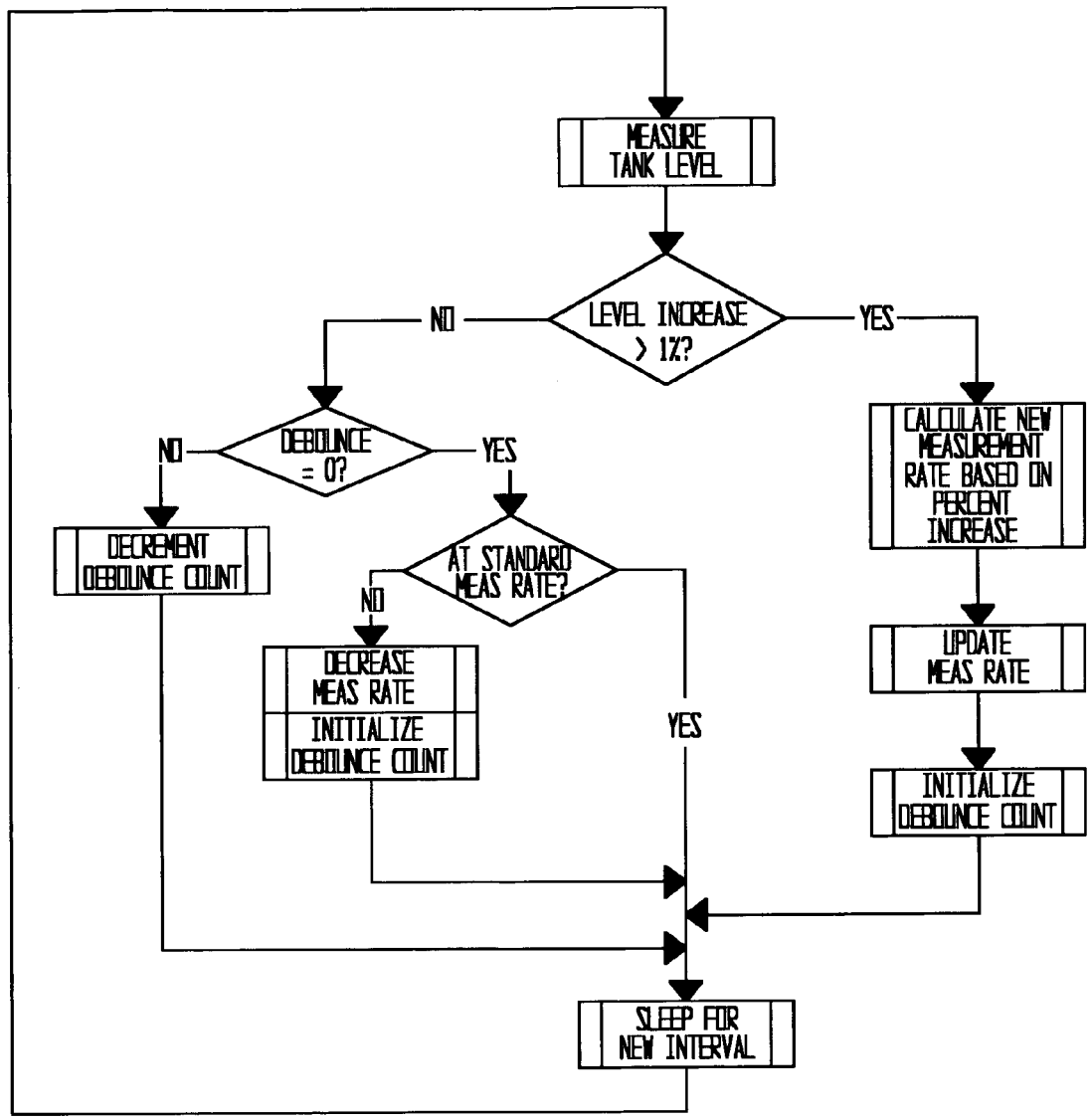
FIG. 9 is a flowchart illustrating the adaptive measurement rate process of the invention.

Referring to FIG. 9, an adaptive measurement rate (AMR) enables the transmitter 11 to respond quickly to changes in tank 14 level during a tank 14 fill event. Tank 14 level in percent full is normally measured once per minute. If the tank 14 level increases more than one percent since the last measurement, the measurement rate is increased by a factor directly related to the amount of the level increase. A debounce algorithm controls the rate at which measurement rate returns to normal after the tank 14 fill is completed. AMR works in conjunction with ATR to provide responsive tank 14 level monitoring with low power consumption.

Figure 10:
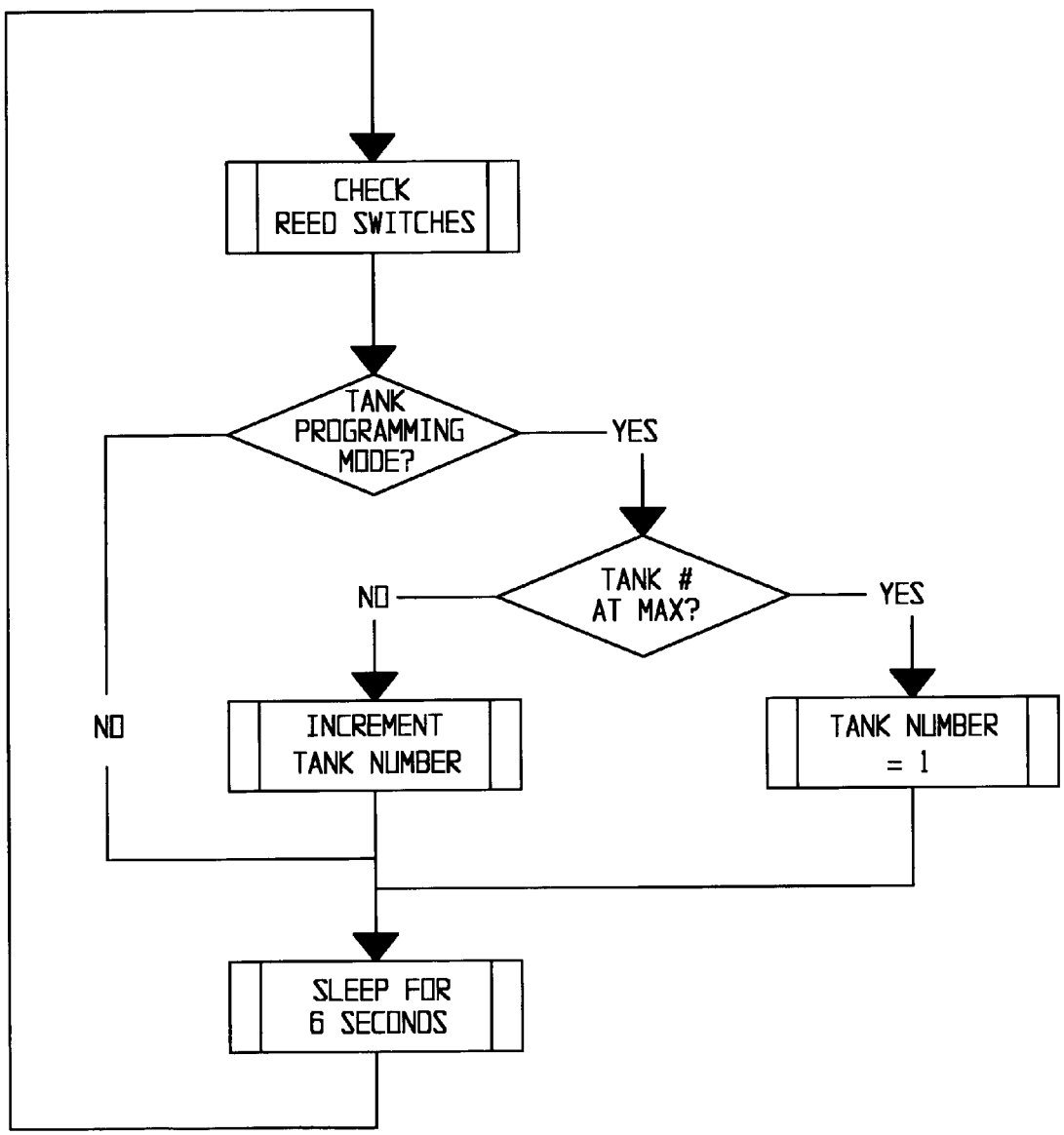
FIG. 10 is a flowchart illustrating the tank number programming process of the invention.

Referring to FIG. 10, tank number programming (TNP) provides a mechanism to easily track individual tanks in a multi tank installation. The transmitter 11 on each tank 14 is programmed to a different number, which is displayed in the hand held fill monitor 60, base unit 12, and host 13. The number is field programmable and stored in internal non-volatile memory.

Figure 11:
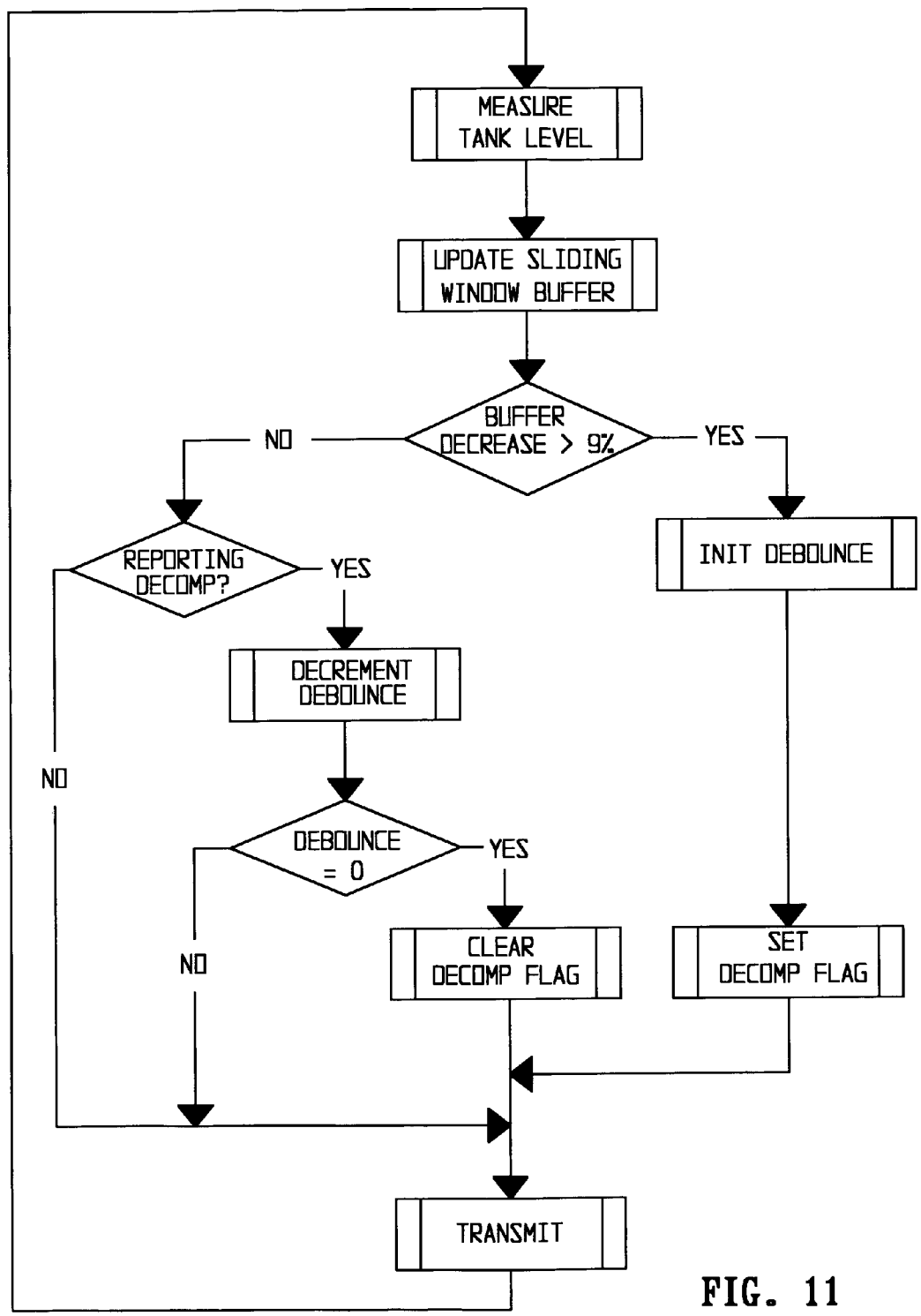
FIG. 11 is a flowchart illustrating the tank decompression monitoring process of the invention.

Referring to FIG. 11, if the tank 14 level decreases at a high rate, the transmitter 11 will transmit a decompression event to the base unit 12. The base unit 12 has a configurable tank 14 decompression rate alarm threshold. If the current rate of decompression exceeds the threshold, the base 12 will report an alarm to the host 13. The transmitter 11 uses a one hour sliding time window to watch for a decompression event. The transmitter 11 will qualify a decompression event if the tank 14 level drops at least 10 percent within the time window. When the event is qualified, it is transmitted immediately and every half hour for four hours. Decompression events are transmitted even if the transmitter 11 is currently in the process of sending another transmission, for example a fill, low level or other event.

Figure 12:
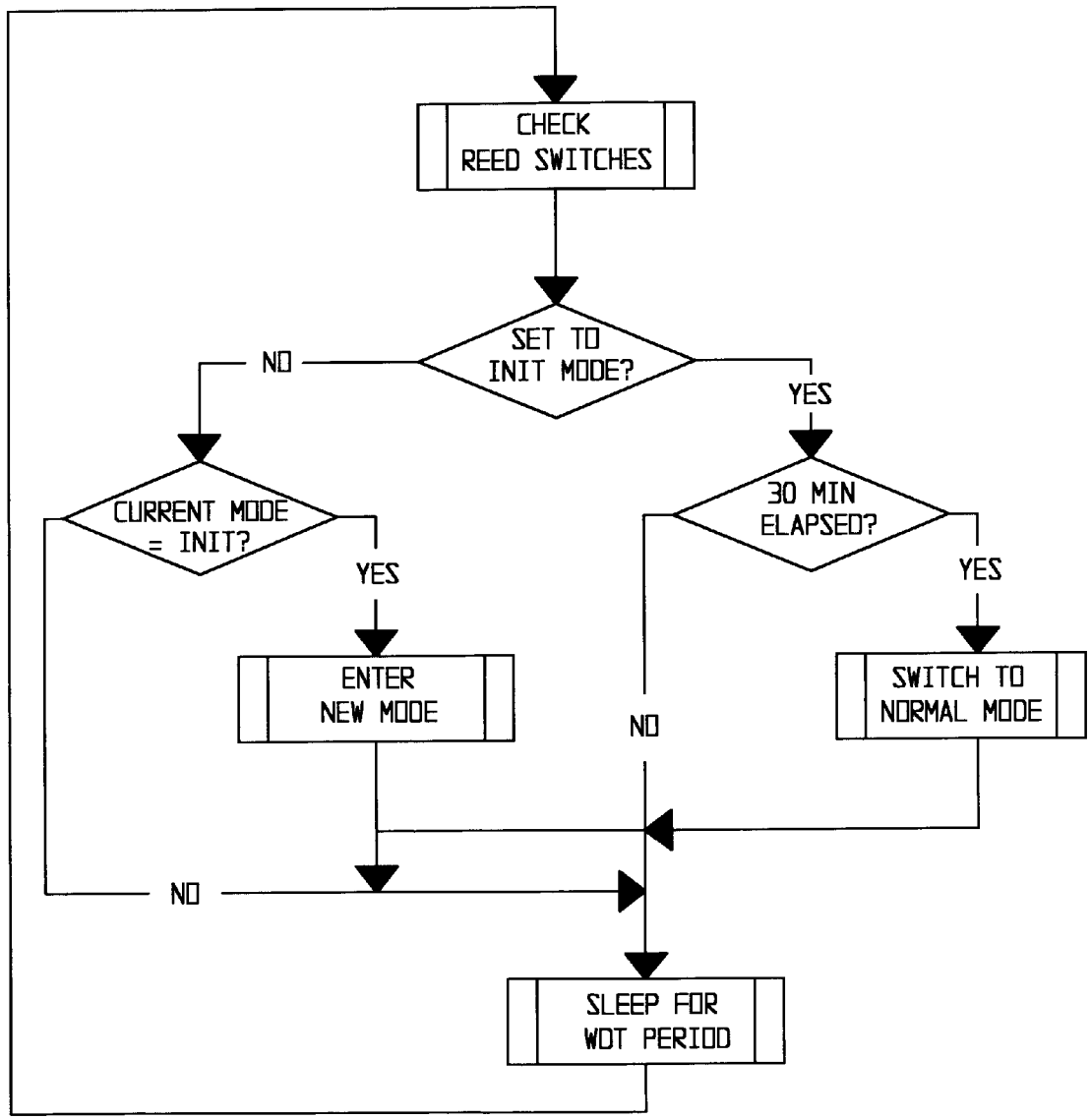
FIG. 12 is a flowchart illustrating the transmitter initializing process of the present invention.

Referring to FIG. 12, transmitter 11 initialization mode is used during installation to register the transmitter 11 with a particular base unit 12. This feature avoids burdensome requirements of tracking transmitter hardware serial numbers during installation and configuration. During installation, a transmitter 11 is first put into Initialization Mode (via the external programming magnet 24). Next, a base unit 12 is also put into Initialization Mode, which automatically registers the transmitter 11 with the base unit 12. The transmitter 11 will remain in the Initialization Mode until the installer changes the transmitter 11 to another mode or until the transmitter 11 times out of this mode (for example after 30 minutes).

The tank management system transmitter 11 is safe for installation on an outdoor liquid propane tank 14 and for use with other systems disposed a building. Transmission aspects of the system complies with known RF transmission and telephone line 18 compatibility regulations.

3. System Base

The tank management system 10 base unit 12 is preferably installed on the inside of a propane customer's residence or place of business 15. The base unit 12 collects all data sent from one or more transmitters 11 via RF transmission and reports this data to the tank management system 10 host 13, periodically or as needed, via a standard telephone line 18.

Figure 4:
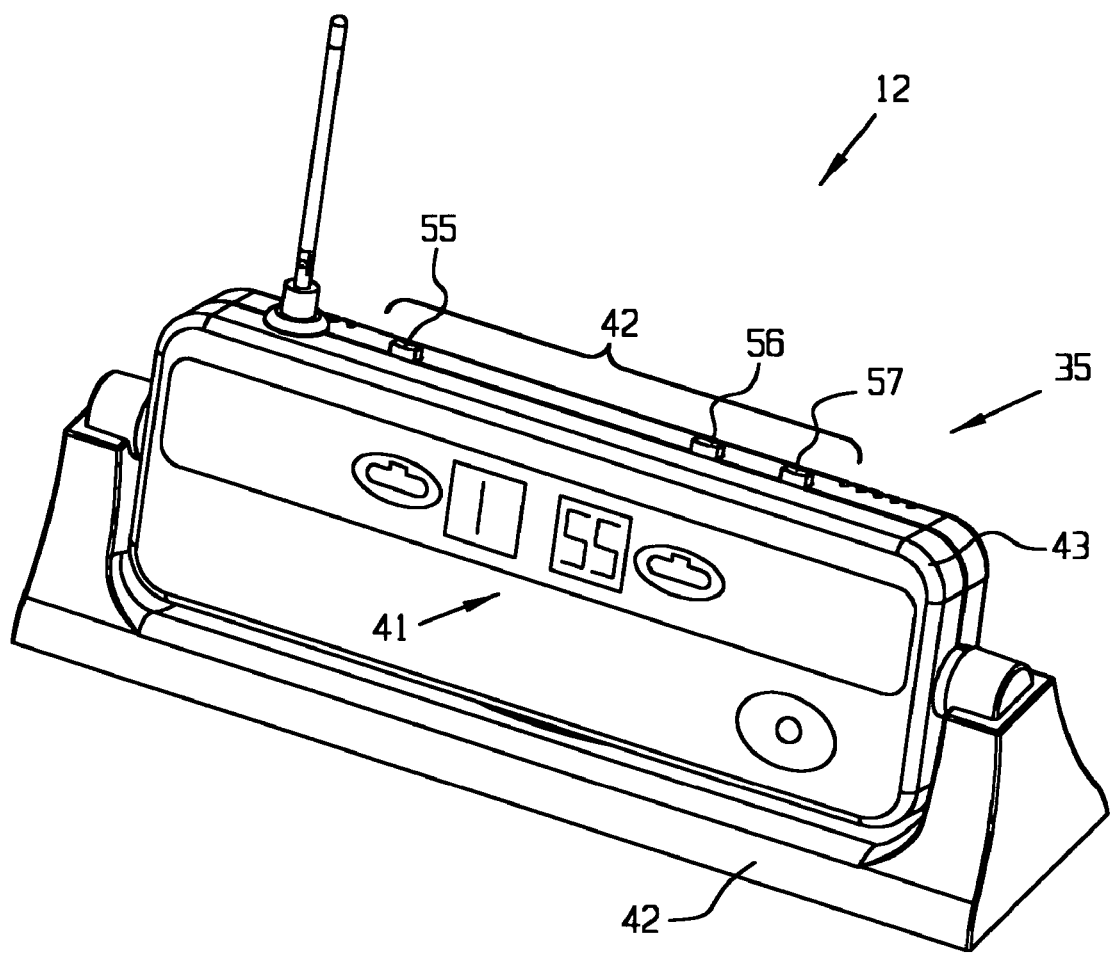
FIG. 4 is a schematic diagram of an embodiment of the base unit of the system.

Referring to FIG. 4, the base unit 12 is housed in an aesthetic case 35 preferably constructed of plastic, suitable for indoor use. The case 35 should be placed on a level surface such as a desk or shelf. The base unit 12 may be placed up to about 1,000 feet from the transmitter 11, preferably within 500 feet to provide a reliable signal. The base unit 12 is preferably powered by a standard 110VAC to 9VDC wall adapter. The base unit 12 uses a simple linear voltage regulation scheme to power the internal circuitry. The base unit 12 has the capability of monitoring up to six tanks.

Figures 1, 7A:
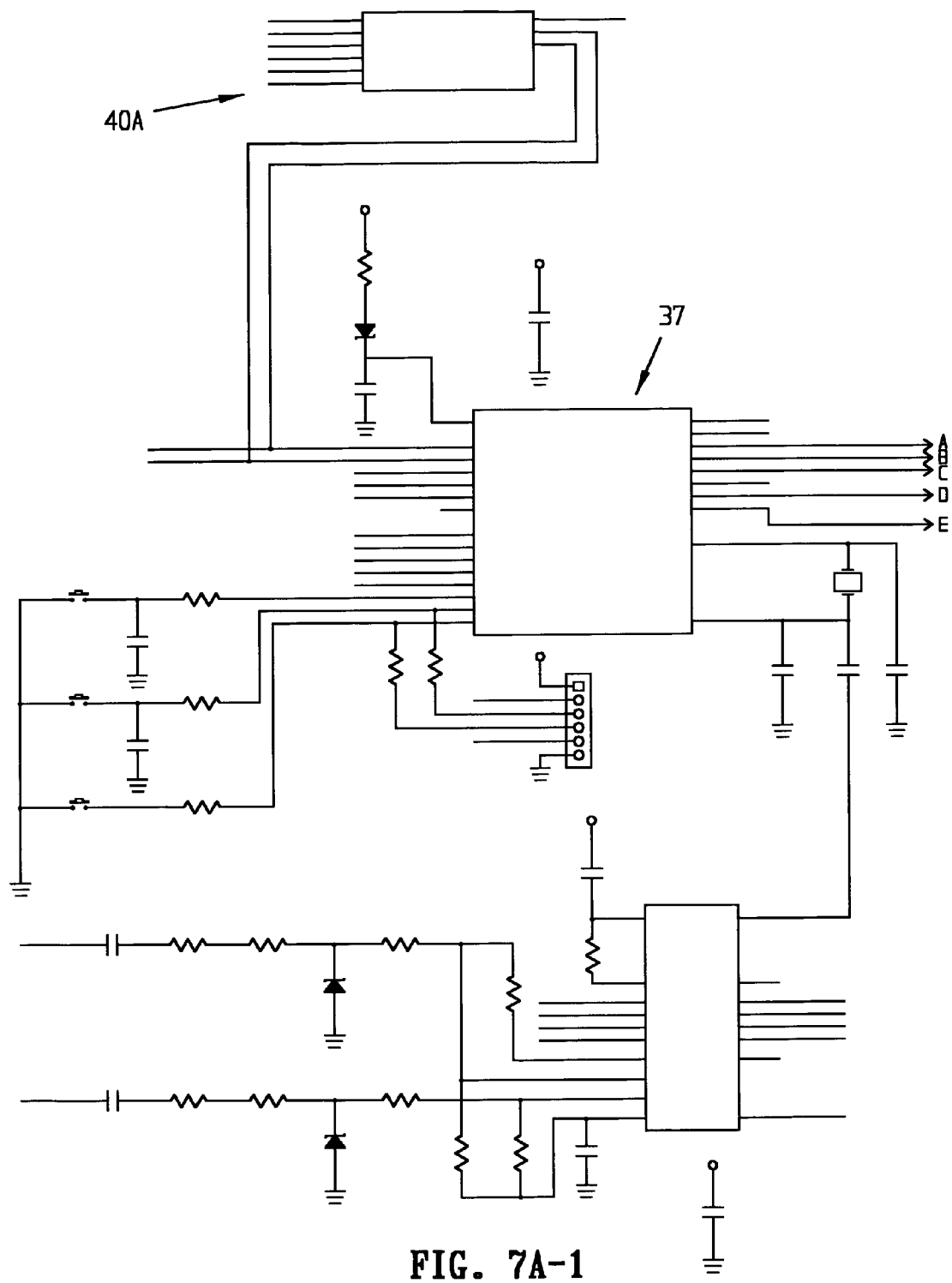
Figures 2, 7A:
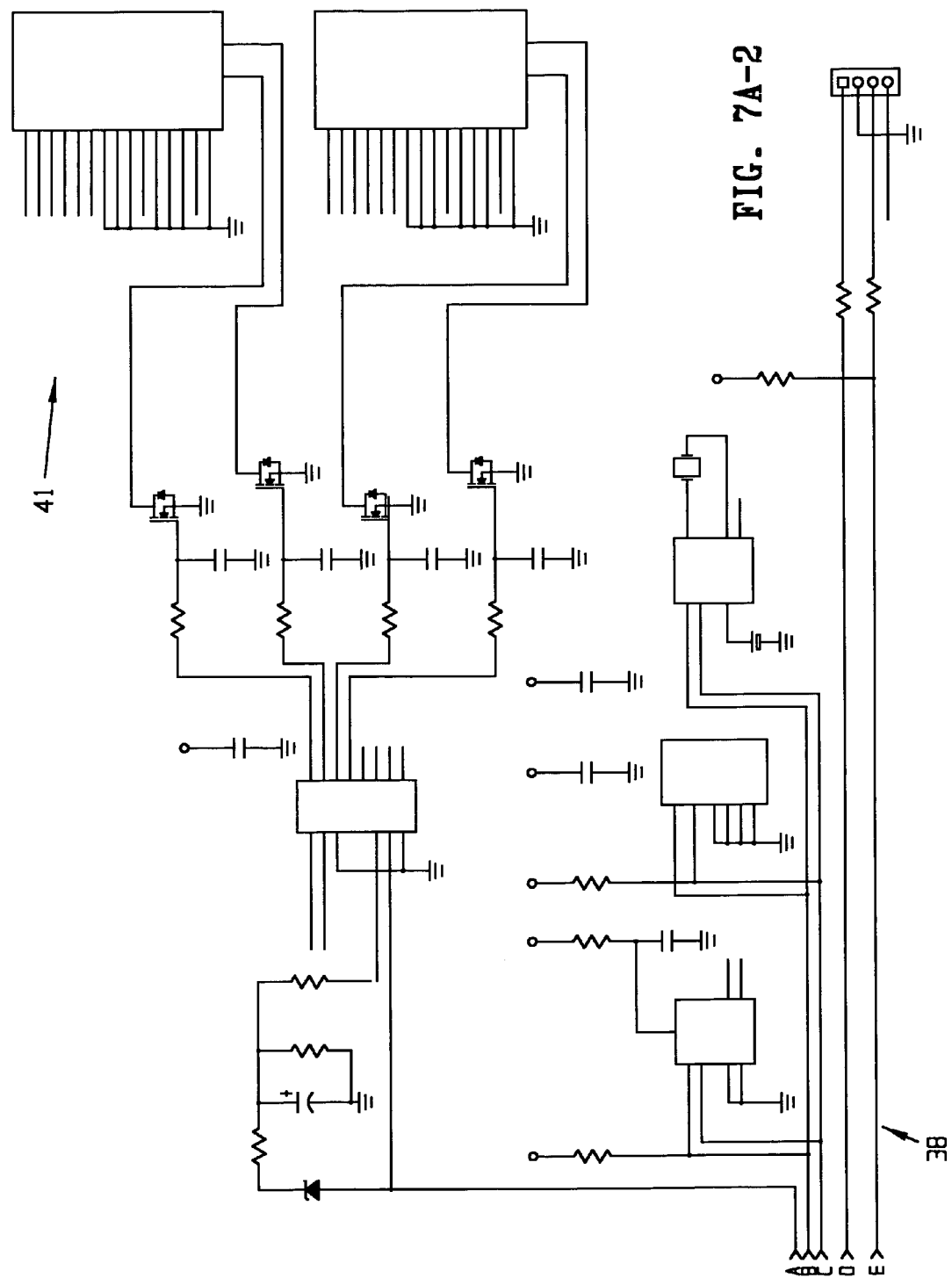
Figures 3, 7A:
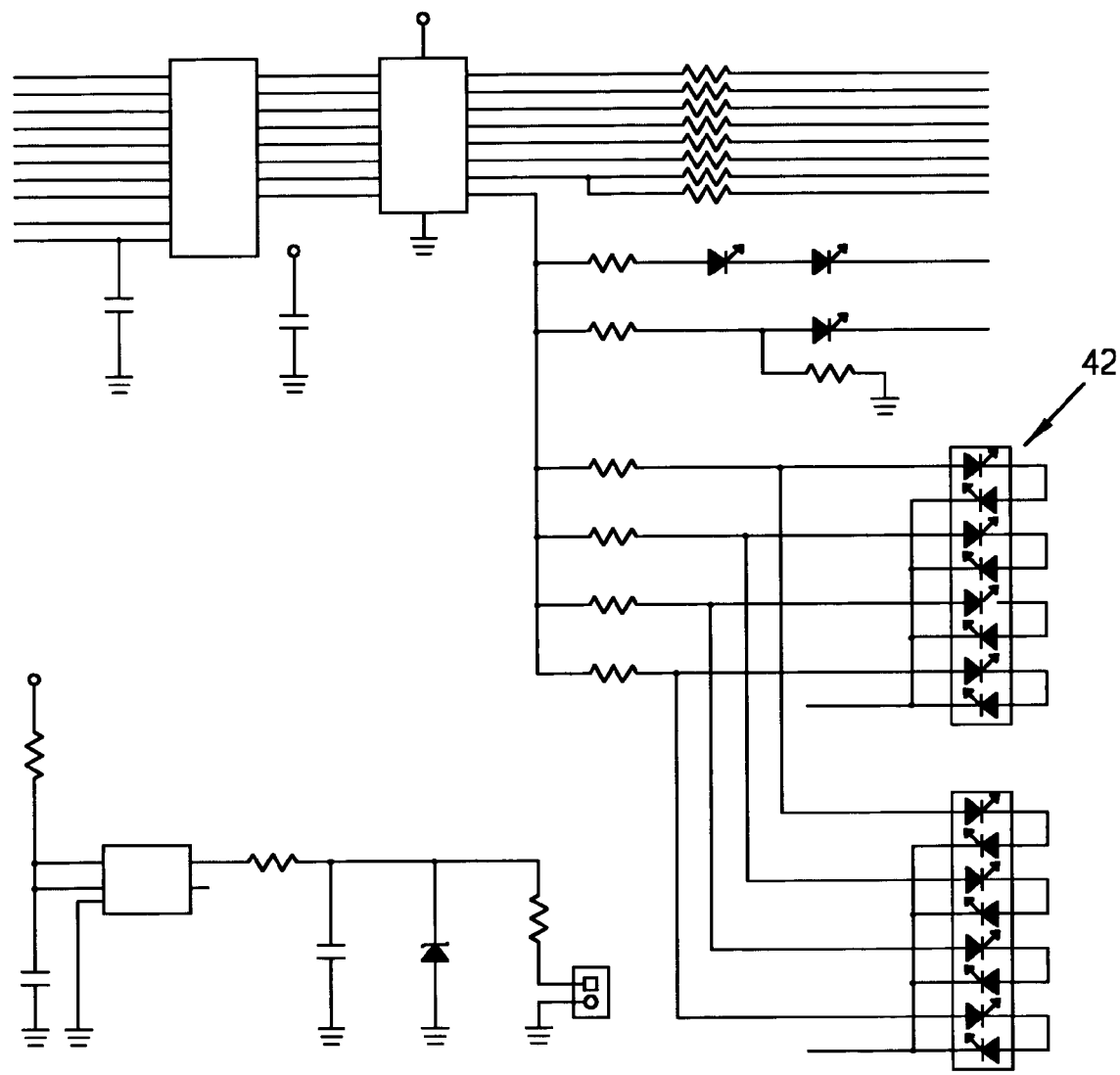
Figures 1, 7B:
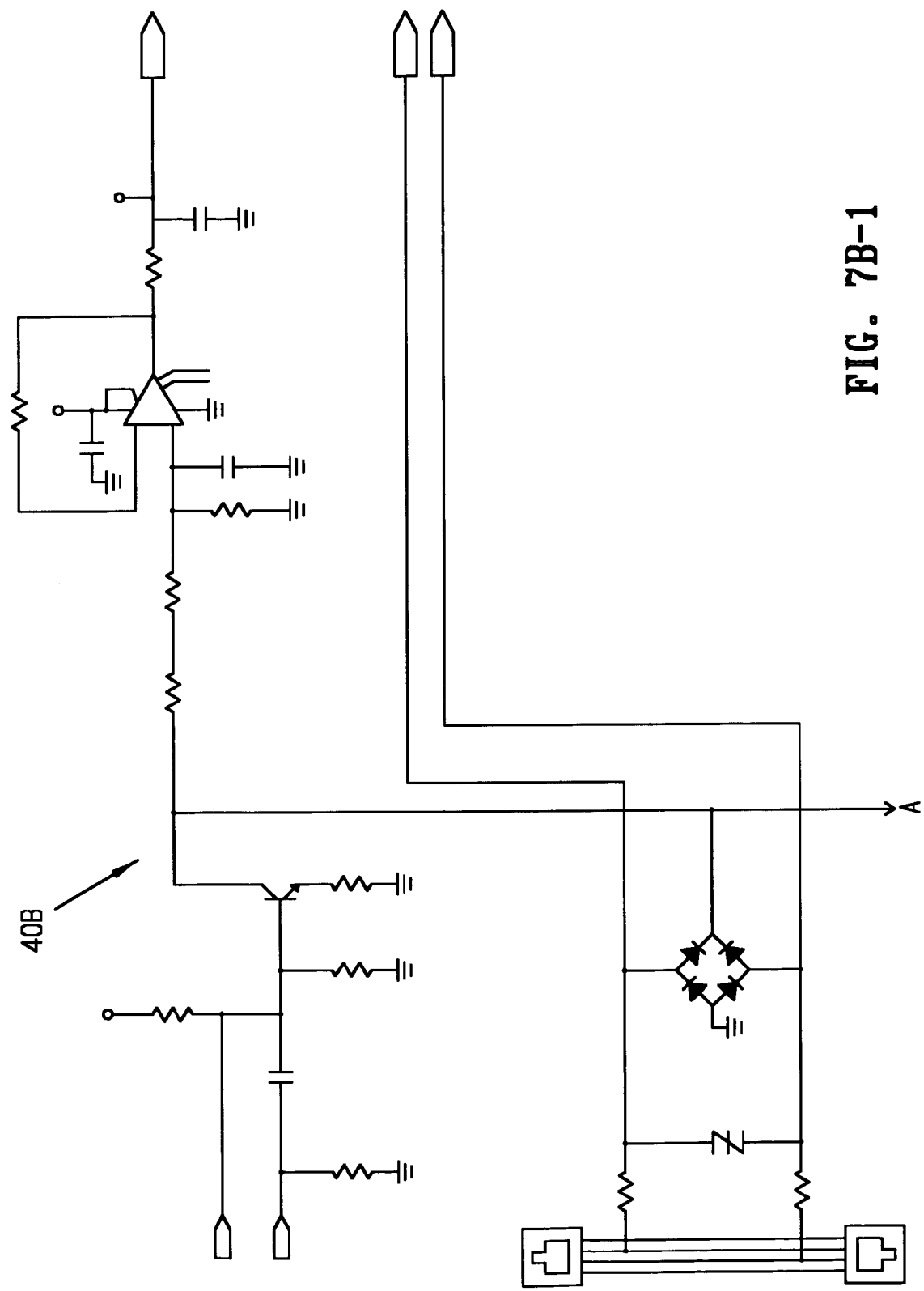
Figure 7B:
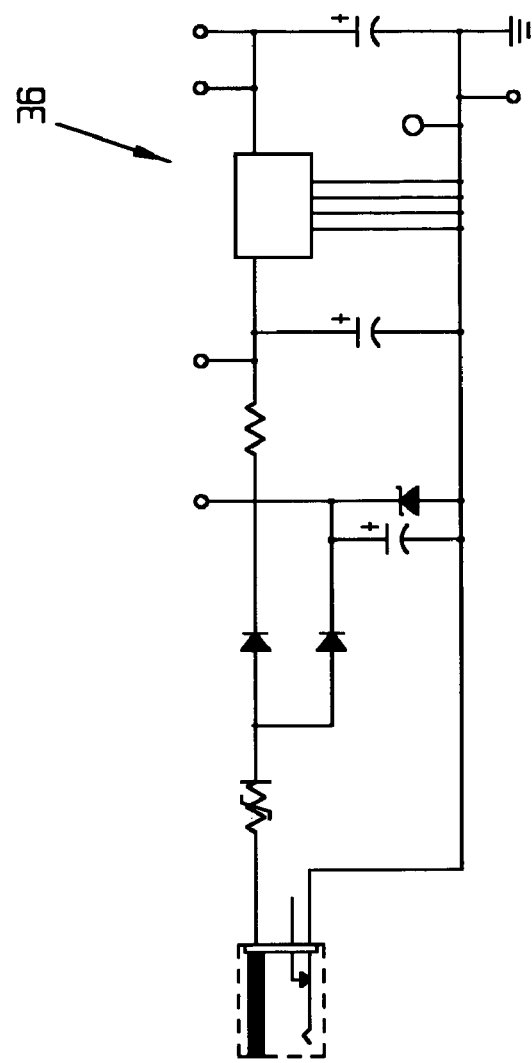
FIGS. 7 *a* and *b* are a schematic diagram of components of the base unit.
Figure 2:
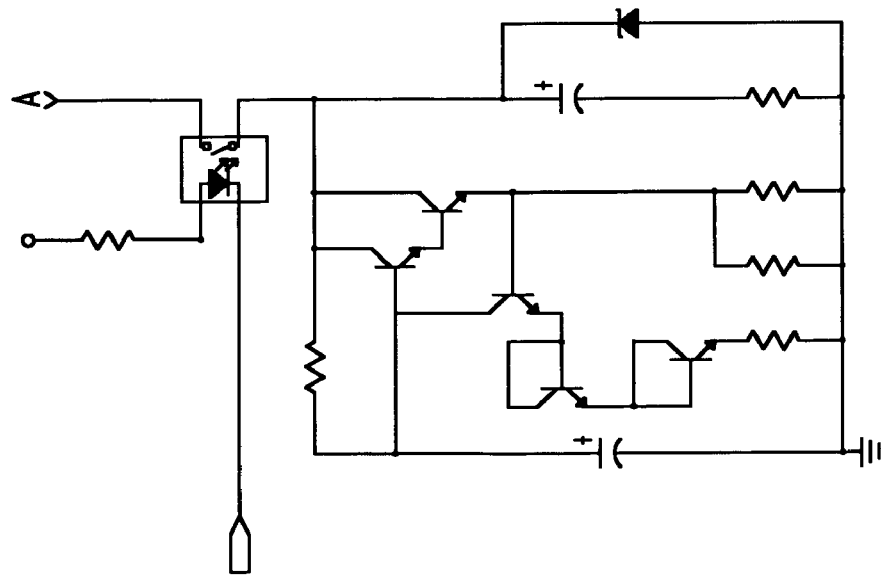
Figures 3, 7B:
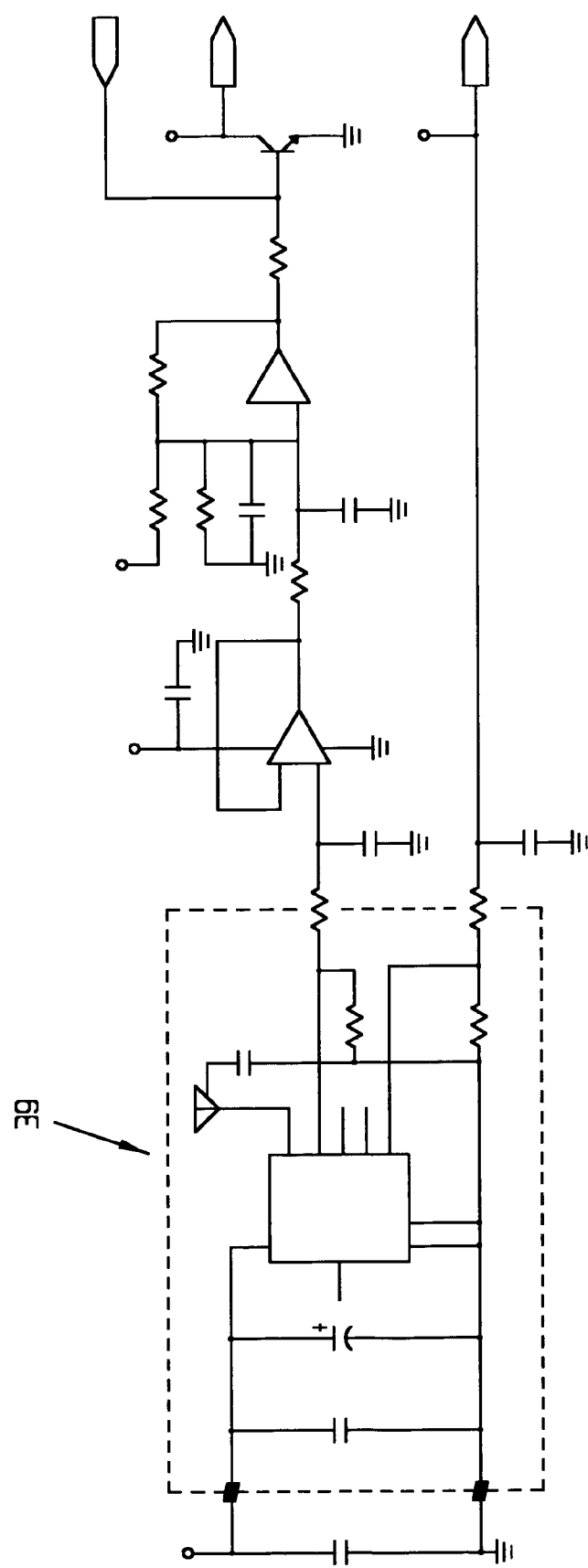

Referring to FIGS. 7a and b, the tank management system base unit 12 hardware is comprised of the following functional blocks:

Case and mounting system 35.
AC to 9VDC power adapter and power supply 36.
System microcontroller and non-volatile memory 37.
Ambient temperature sensing and measurement circuit 38.
RF receiver module and antenna 39.
Telephone line interface 40.
Information display 41.
User Interface 42.

The microcontroller 37 is used to monitor ambient temperature and receive data via the RF receiver module 39. The microcontroller 37 is also used to control data reports sent to the host system 13. The base unit's 12 non-volatile memory 37 is used to store configuration information sent from the host 13. The ambient temperature is measured and reported to help monitor ambient conditions. This information can be used to generate "temperature out-of-bounds" alarm reports to the host 13.

The base unit 12 uses an internal RF receiver module and external antenna 39 to receive data from the transmitter 11 at the tank 14. The internal RF receiver 39 preferably operates in the 902-928 MHz ISM band, or alternatively the 260-470 MHz or other band. The telephone line interface 40 is used to report collected data to the host system 13 located at the propane distributor's facilities 16. It is also used to monitor the status of the telephone line 18 to make sure that the operation of the base unit 12 does not interfere with the customer's access to the telephone line 18.

Referring again to FIG. 4, the base unit's 12 case 35 comprises a base 43 and a housing 44 with the information display 41 and user interface 42. The housing 44 is pivotally connected to the base 43 so that it can be adjusted for optimal viewing in a variety of locations. The base 43 may be mounted on a horizontal surface such as a table, desk, counter or the like, or a vertical surface such as a wall or cabinet. The display 41 preferably consists of a pair of light emitting diode type displays disposed side by side, but may be a single display or additional displays, and may be LCD, VFD or other type display. The display 41b can be viewed conveniently, comfortably and accurately from a distance of approximately twenty (20) feet. The display 41 can also be viewed in the dark. The display 41 brightness is adjustable and preferably has eight brightness levels. The base unit 12 is preferably AC powered with a memory preservation function to preserve data during power outages. The display 41 is configurable to display information transmitted by multiple tanks. The user interface 42 preferably comprises a mode switch 55, a decrement switch 56 and an increment switch 57.

The base unit 12 conveys tank 14 level information, tank 14 activity, and other tank 14 information to the propane customer. The display 41 may also be used to indicate a variety of other parameters and conditions such as time of day, temperature (indoor and outdoor) in Fahrenheit or Celsius, and the like. Time may be set automatically by the host unit 13 and transmitted to the base unit 12 for display 41 so that the user will not have to adjust the time. This is provided by Auto-Update (AU). AU prompts the host unit 13 to send the current time at the host 13 to the base unit 12 during base unit transmission of tank 14 level data to the host 13. The display 41 of the base 12 may also be configured to receive information from the host 13 such as late bill payment status, propane or other fuel or utility products or services advertising, and the like.

The tank management system 10 base unit 12 has three basic operating modes, namely:

Initialization or Configuration—used at installation time.
Monitor—normal operating mode while in service.
Report—used to report data to the host.

The tank management system 10 base unit 12 is put into configuration mode at installation time. While in this mode, the base unit 12 is configured with host 13 telephone numbers and a variety of other parameters needed for proper operation. Since RF transmission distance is limited (approximately 1000 ft. maximum under ideal conditions), a simple, reliable verification of a useable RF signal is beneficial. During installation, the base 12 indicates the RF signal level via a received signal strength signal indicator (RSSI) from 0 to 99 so that the installer can properly position the base 12 in the premises 15. Also during installation, the base 12 indicates the condition of the telephone line 18 as disconnected, active, or off-hook.

Monitor mode is the normal operating mode for the base unit 12. While in this mode, the base unit 12 is waiting for reports from tank transmitters 11, measuring the ambient temperature 38, monitoring the status of the telephone line 18 and displaying current data and status information.

The base unit 12 will enter report mode when it has determined that it is time to call the host 13. Report intervals will be based on a number of factors such as configured report interval, alarm conditions, etc. During a report, the base unit 12 will have control of the customer's telephone line 18. If a customer tries to use the telephone line 18, the base unit 12 will relinquish control of the line.

Alarm conditions may include tank 14 level low, tank 14 level critically low, base unit 12 ambient temperature 38 too low or too high (to signal an abnormal temperature situation which is symptomatic of a failure or error in the building heating or other system) rapid tank 14 level decline, tank 14 transmitter malfunction, tank 14 transmitter low battery 31, and tank 14 fill conditions. The alarm conditions may be transmitted to the host 13 operator (and other remote locations) immediately or at preset times. Under normal conditions, this ensures that the data present in the system is up to date. Alarms permit reporting of power failures, which is unique because prior art systems fail to operate in power failures.

The base unit 12 may also include the capability to report to the host 13 even in the event of a power outage. The power used to accomplish this is previously stored energy from when AC power was present and loop current from the telephone line 18 during reports. As such it can even report the AC power failure at the customer premises 15 condition to the host 13 (enabling the host operator to notify the customer or a third party. In combination with the temperature sensor 28, this will enable owners of premises 15 such as cabins, lodges and seasonal homes to become aware of problems and prevent or minimize freeze damage.

In summary, the base unit 12 provides an attractive, convenient, user-friendly means for the propane customer to see the level of propane in their tank 14 for peace of mind, inside their home without the need to go the tank 14. It further provides in a unitary device, a clock, outside temperature at the tank 14, inside temperature in the home. Because it is connected to a telephone line 18, it can optionally provide power outage reporting, caller ID, answering machine and other functions. Finally, the base 12 has a clean, modern and attractive display panel 41 upon which the commodity provider can place their trademark name and logo whereby the base 43 functions as a sales "tool" to promote their image and foster customer goodwill.

4. System Host

Referring again to FIG. 1, the tank management system 10 host system 13 is located at the propane gas distributor's operations center. The host system 13 collects data from one or more base units 12 disposed at customer premises 15 preferably via a Public Switched Telephone Network (PSTN) network 18. PSTN refers to the international telephone system based on copper wires carrying analog voice signals. This is in contrast to newer telephone networks base on digital technologies, such as ISDN, FDDI and the like. Telephone service carried by the PSTN is often called plain old telephone service (POTS).

Figure 2:
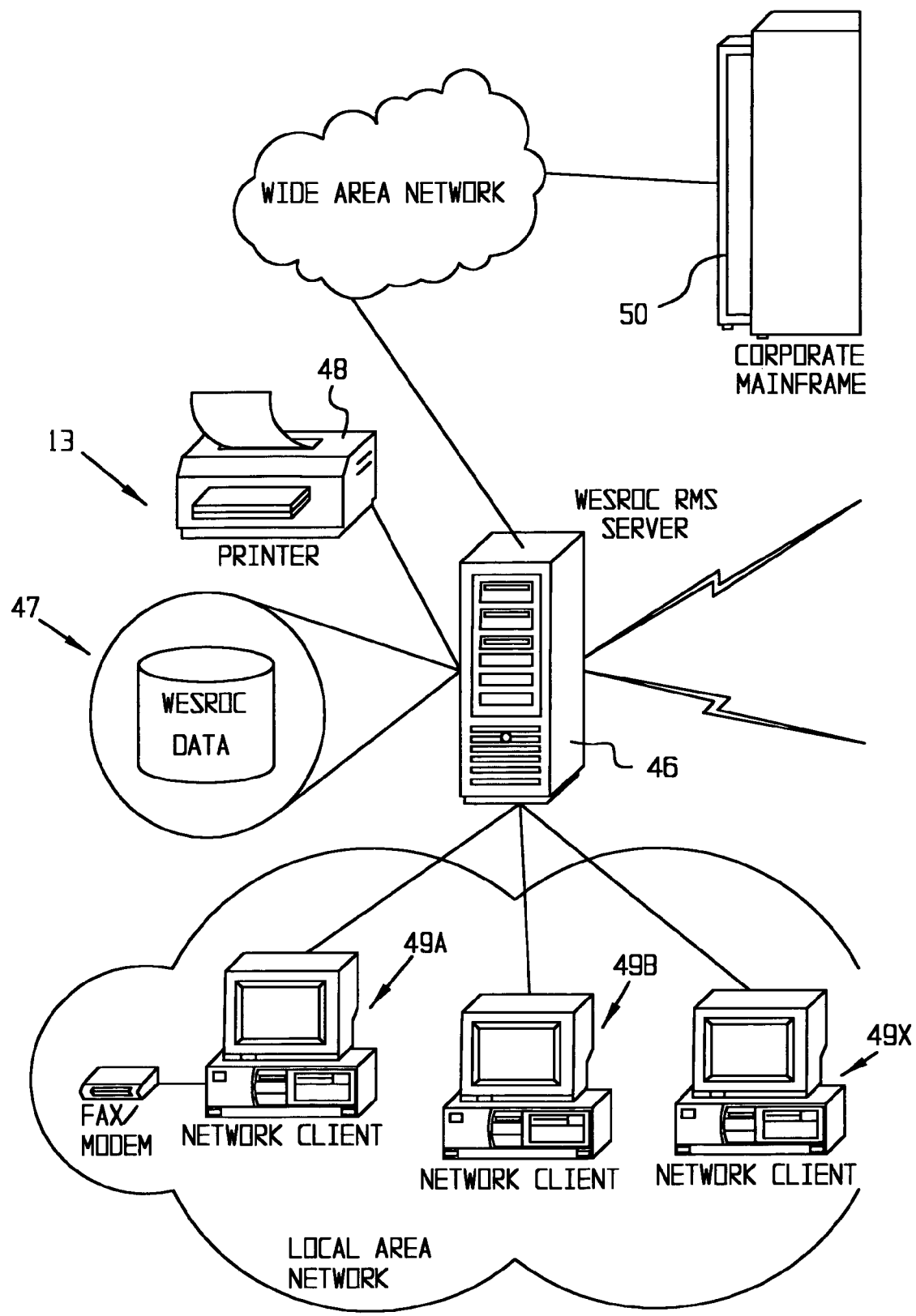
FIG. 2 illustrates basic components of another embodiment of the tank management metering system for use with multiple tank sites.

Referring FIG. 2, another embodiment of the host system 13 is shown which collects data from a plurality of bases disposed at customer premises 15a, b, x located throughout the distributor's delivery area. This embodiment includes a server 46 including a data disk or disks 47 and connected to a printer 48, a plurality of clients 49 connected via a LAN, and a mainframe 50 connected via a WAN.

The tank management system host system 13 is comprised of the following functional blocks, namely:

Host computer system 46

Telephone line interface card or modem.

Host system software package.

The host software package is preferably a WESROC® metering and telecommunications system provided by Independent Technologies, Inc. of Omaha, Nebr., USA. Embodiments of the WESROC system are disclosed in U.S. Pat. Nos. 5,410,590 and 5,651,057 which are incorporated by reference herein.

The WESROC® Route Management System gathers data from multiple base unit 12 devices processes the information and stores it in a database management system (DBMS). The base unit 12 receives information from tank transmitters 11. Configuration parameters and alarm thresholds are sent to the base unit 12 enable the base unit 12 react to information independently of the host 13. The received data once processed is placed in various tables in the DBMS which can be accessed by the operator. Analysis reports can be run against the data to reveal the current status of the base unit 12 and the associated Tank Transmitter(s) 11.

The host 13 computer is comprised of four main software modules. These modules can all be run on the same computer in a multi-tasking windows system or they can also be separated and run on individual computers in a networked environment. An RMSComm module is a program written in C++ that gathers the raw data from the base units 12 as they report in via a telephone line 18. An RMSViewer module also written in C++ is the visual interface for the RMSComm module. The RMSViewer displays the actual communication events as they occur between the host 13 computer and the base unit 12. A WESROC® Database Management System provides a means to administer the base units 12 and their corresponding tank transmitter(s) 11. An Unattended Processing module, which is initiated from the WESROC® module, supports the unattended creation of information in the form of a print out, a fax, a data file or an E-mail.

The RMSComm module manages all data communications between the host 13 computer and the base units 12. This module continually scans the telephone line 18 interface for a ring event. When a ring is detected the telephone line 18 is taken off-hook and two-way data transfer from the host 13 computer to the base unit 12 occurs. Interactive Dual Tone Multi-Frequency (DTMF) packets with data integrity checks, arranged in a special format, are used to transfer the data. This DTMF format facilitates short reporting times and enhances the ability to support rural locations that have long loop lengths with load coils. All communication events generate an entry in the data log table. Upon successful communication with a base unit 12, RMSComm will place the raw data received into a data log table for processing. The Configuration mode is an interactive event using synthesized voice prompts to facilitate the base unit 12 installation process. A twelve digit unique Base ID number is required for the configuration of all base units 12. The Base ID provides security and traceability for the overall system. If a base unit 12 calls into the host 13 and a record for the base unit 12 with a matching Base ID is not found then the report event is marked as Foreign and a corresponding alarm is generated. Caller ID on the telephone line 18 can then be used to identify where the base unit 12 is calling from.

The RMSViewer module provides interactive display of communication events which allows for enhanced diagnostics. When an incoming call is detected on one of the host 13 computers telephone lines 18 (ring), RMSComm will go off-hook and signal RMSViewer that this has occurred. As DTMF packets are sent from and to the host 13 computer and the base unit 12 this information is displayed.

The WESROC® Database Management System enables the operator to use menus, screens, reports and graphs to monitor and administer the base units 12 and tank transmitters 11. This program module also has the ability to maintain historical information on tank 14 activity over a period of time. Global changes made to groups of records are accomplished using this program. System diagnostic information such as host 13 initiated alarms such as base unit 12 not reporting on schedule and no change in tank 14 level, are available. Base unit 12 diagnostic information such as no line, line in use, power fail, system offline, and report interrupted is displayed on various screens. Base unit 12 configuration parameters such as user defined reporting interval can be set to one of the following Monthly (once a month on a specific day), weekly (once a week or variations thereof), daily, 12 hour, 6 hour, 4 hour and hourly. The Base ID is a unique 12 digit number offering security as it tracks the base unit 12. If a base unit 12 calls in and no corresponding base unit ID is found the host 13 still accepts the data but marks it as a foreign report. Pop up alert messages are generated when a specific data threshold is exceeded warning the operator of a specific event. These messages include but are not limited to Tank 14 Level Low, Tank 14 Level Critical, Tank 14 Transmitter Battery 31 Low, Tank 14 Decompression, and Tank 14 Fill. Virtual host access from a remote location is supported. The route list report generated by the system contains tank 14 information and can be organized to best suit the material delivery needs. Data can be imported from other systems to minimize data entry errors. WESROC® RMS has the ability to stand alone or interact with currently installed systems.

The Unattended Processing module supports user defined data outputs from the system in one of the available formats without the need for the user to manually initiate the process. Once a process is built into the system and configured it will automatically run. The available formats are export data to file, send information using facsimile machine (Fax), print out a report to a local or networked printer, Email information. This module can also initiate a custom program or task configured to run at a specified date and time.

5. Hand Held Monitor Option

Figure 15:
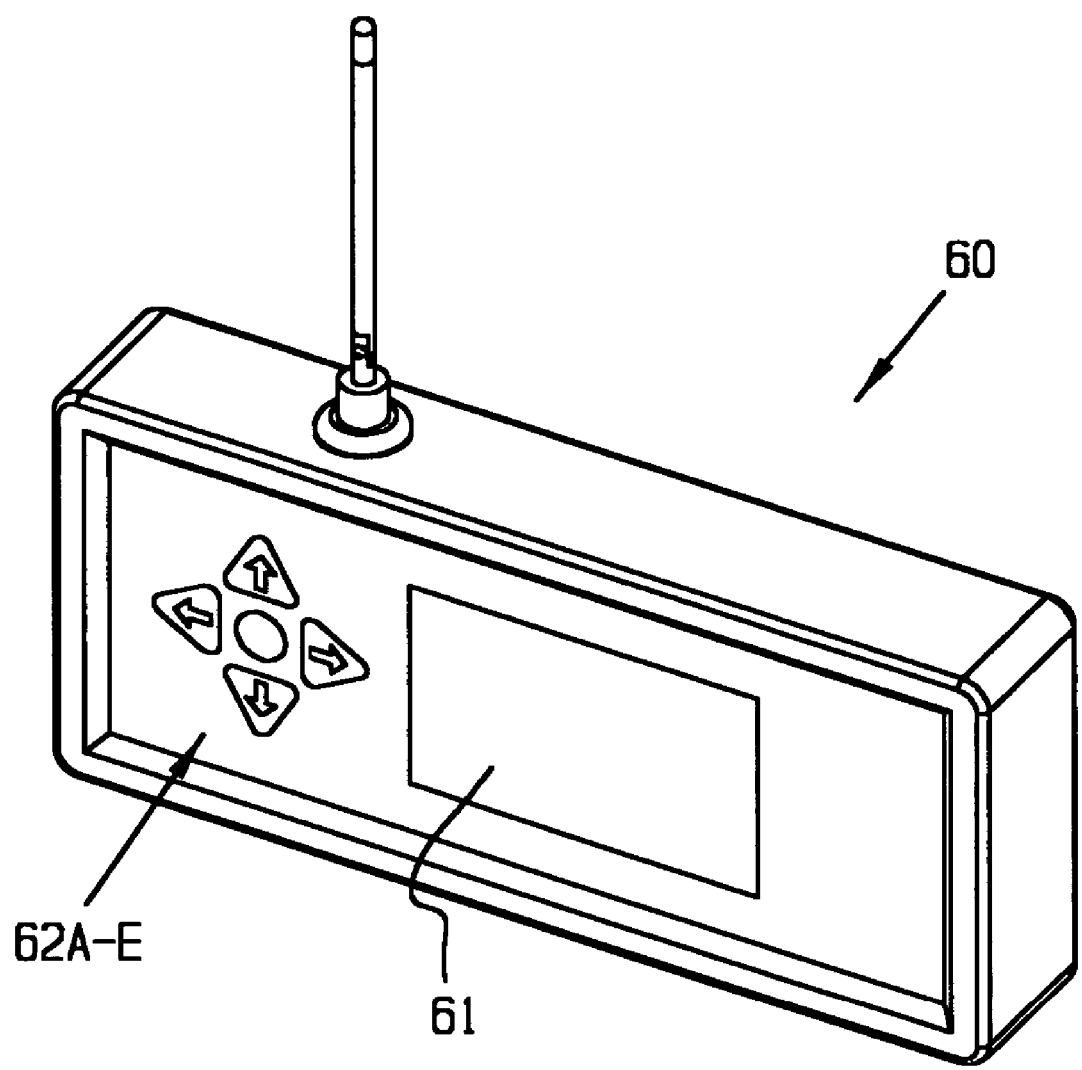
FIG. 15 illustrates an embodiment of the hand held monitor of the system.

Referring to FIG. 15, the tank management system 10 may optionally include a hand held monitor 60 for receiving, viewing and storing data from the tank transmitter 11. The hand held monitor 60 can be used during installation of the system 10. Additionally, the hand held monitor 60 may be used during a tank 14 filling procedure, for example to permit filling personnel to monitor the procedure at a distance, in a building or in a vehicle. The handheld monitor 60 receives signals and displays information from tank transmitters 11. For viewing which tanks 14 have recently transmitted, the information from up to six tanks are displayed in the tank screen. For direct viewing of the level of material in a tank 14, an individual tank transmission stream can be monitored with large, readable, characters showing the level of the tank 14 from the last transmission. It receives the same data that the base unit 12 receives. It is intended for two main purposes: (a) as a tool to aid installers of the system, and (b) as a tool for remotely reading tank 14 level during the filling of a tank 14.

The Monitor 60 operates on a standard 9V battery and will typically operate for 50 hours on an alkaline battery. Battery level is shown so that the user can anticipate the time when battery replacement is necessary. When the Monitor 60 is operated on it's internal power, it automatically employs a timer which will shut the monitor off after 15 minutes of inactivity. This feature prevents dead batteries from the monitor 60 accidentally being left on. The monitor 60 can be powered by an external power source, for example either an AC powered wall adapter or a cigarette lighter adapter. External power voltage can be anything from 9VDC to 35VDC making it tolerant of a wide range of power sources.

The power switches automatically between battery power and external power based on the presence of external power. Normal operation is maintained during these transitions.

The Monitor 60 has a high contrast, high resolution (128×64 bitmap), FSTN liquid Crystal Display 61. It maintains high contrast in all lighting conditions and does not become unreadable in direct sunlight, as a light emitting display would. The display 61 operates over a temperature range from −30 C to +60 C, making it suitable for use in the environment seen in a propane delivery truck. It is capable of displaying complex graphics along with regular alphanumeric characters. A display backlight is available for viewing the display 61 during low light conditions.

The monitor 60 functions are controlled through five buttons 62 $a$-$e$ that are preferably a part of a membrane keypad on the front of the unit. The buttons 62 $a$-$e$ are organized in an Up/Down/Left/Right fashion which makes them useful when navigating menus and functions. A single button in the middle of the other buttons is used to turn the monitor 60 on and off and to control the backlight.

The monitor 60 has an RS-232 serial data interface that is used for updating the operating system software of the monitor 60 and for making the acquired data from tank transmissions available to a standard PC. The data logging feature can be useful in determining the source of persistent interference problems and for general purpose data collection.

The monitor 60 has a piezoelectric beeper that is used for audible alerts to the user. This is used for notifying the user of events that may require their attention, such as a tank 14 approaching full during a fill. This feature will be explained later in the "Fill Mode" paragraph.

The monitor 60 utilizes a microcontroller (MCU) to perform all of the monitor's 60 required functions. Being a microcontroller as opposed to a microprocessor, very few support components are necessary for the device to perform it's function which helps reduce the final cost of the monitor 60. The MCU is preferably a PIC18F452 manufactured by Microchip Technology, Inc. of Chandler AZ. The microcontroller is re-programmable, which facilitates the ability to update the software in the field through the RS-232 data port using a standard computer. When software updates are produced, they can be sent to customers for their monitors 60 electronically (email). This removes the need for the monitor 60 to be sent back to the factory for updates.

The software has three main screens (provided on the display 61) that will be used most of the time. The "Logo" screen, the "Tank List" screen and the "Fill Mode" screen. The logo screen is displayed when the monitor 60 is first powered up. This is a software definable screen and is intended to show the logo of the customer (propane vendor) as a promotional device. These would be the typical graphic images of the respective company's logos. This logo is created on a development computer as a bitmap file using a graphics program and is converted into a file that can be linked into the executable which the microcontroller in the monitor 60 is programmed with. The logo screen remains displayed until one of the navigation buttons is pressed (i.e. Left, Right, Up, or Down). The logo remains displayed when the backlight button is pressed so that logo can be displayed with the backlight on.

The first screen to appear is the Tank List screen. This screen shows all of the tank transmitters 11 (up to six at one time) that the monitor 60 has heard from. In this screen, the following items are displayed for each of the tanks 14 that have been heard from: The Serial Number of the transmitter 11, the tank 14 number (for multiple tank installations and will be from 1 through 6), the last reported level of the tank 14 in percent and the Time Since Last Transmission from that specific tank 14. There is a cursor in the shape of a pointer on the left-hand side of the screen that points to one of the tank 14 entries. This cursor can be moved up and down in the list of tanks 14 by using the up and down buttons. For ease of operation, the pointer wraps from the top-most entry to the bottom-most entry when moving up from the top of the list. And vice versa when the pointer is at the bottom of the list. Located at the bottom of the Tank List display, two extra tank 14 parameters are shown for the entry in the tank 14 list to which the cursor is currently pointed. These are the Received Signal Strength Indicator (RSSI) of the tank transmitter 11 and the temperature of that transmitter. The RSSI is an arbitrary number from 0 to 99 and is a logarithmically scaled number. The temperature is displayed in degrees Fahrenheit. As the tank list cursor is moved up and down the list, the displayed RSSI and temperature change to the respective values for that tank 14. In the far lower right hand side of the display 61 is a graphical indication of the internal 9V battery status of the monitor 60. This icon changes as the battery level changes and appears as a "filled-up" battery. The more battery capacity that remains, the more full the battery icon appears. When the battery icon appears empty, there is roughly 20% battery capacity remaining.

The fill mode function is used to "lock on" to a specific tank 14 (by Serial Number) and pay particular attention to the level of that tank 14. The level of the tank 14 is displayed in large characters in the middle of the graphic display 61. This allows the level to be seen comfortably from at least 20 feet away. This is important so that there is no chance of misreading the display and accidentally overfilling the tank 14. Also, the serial number of the tank transmitter 11 is displayed in the upper left hand corner of the display 61 in small characters so the operator can verify the exact tank transmitter 11 level that is being viewed. Since the system supports up to six tanks 14 per base unit, the tank number is displayed in the upper right hand corner of the display 61, again in small characters. The temperature of the transmitter 11 is shown in the lower left corner. This is useful as the maximum allowable fill level depends on the temperature of the propane. The Time Since Last Transmission in the lower right. The TSLT is an important feature since the displayed tank 14 level is the level reported from the last transmission. It is important to know if the transmitter 11 stops transmitting since the display 61 will not update. If too many transmissions are missed, the audible beeper alarm will sound indicating that the displayed information is not up-to-date.

When the tank 14 level reaches a pre-determined threshold, the audible alarm activates to get the attention of the user to prepare to stop filling the tank 14. The monitor 60 constantly calculates and displays the estimated time required to reach the tank-full threshold. The monitor 60 will typically be located in the cab of the delivery truck. When a fill of a tank 14 is in progress, the tank transmitter 11 automatically increases it's transmission rate so that the monitor 60 will show an up-to-the-minute tank 14 level as it increases. This allows the delivery person the ability to stay comfortable in the truck as the tank 14 fills. It is known that some tanks 14 take on the order of an hour to fill. With the monitor 60, the delivery person can remotely view the progress of the filling process and know, with confidence, the exact status of the fill.

The monitor 60 provides several benefits to the installer. When the tank transmitter 11 is installed on the tank 14 in question, the "Off" 51 magnet 24 of the transmitter 11 is removed from the transmitter and is placed in the "Init" 52 location. This puts the transmitter 11 in initialization mode and starts frequent transmissions for the purpose of initializing the base unit 12. At this time, even before entering the house, the fact that the transmissions are present can be verified with the monitor 60, as that tank transmitter 11 will appear in the tank list. The general health of the transmitter's 11 signal can also be verified. If the monitor 60 is within 10 feet of the transmitter 11, the signal strength will be very close to 99. If the RSSI was for instance, 10, it would indicate a problem with the transmitter 11.

When installing multiple tank-per-base systems, each tank transmitter 11 must have a unique tank number. The tank number of the transmitter 11 is set by placing a magnet 24 on both the "Init" 52 location and the "Off" 51 location. In this mode, the tank number increases by one each time the transmitter 11 transmits. On the monitor 60, the installer can watch the tank number change. After the transmission that transmits the tank number that the installer wishes to associate with that tank 14, the "Off" 51 magnet 24 is removed and the tank number stops incrementing, thus setting the tank number for that tank 14. The same thing can be done with the base unit 12, but by using the monitor 60 to set the tank numbers, all of the tank transmitters 11 can have their tank numbers set before ever entering the house, making the installation process more efficient and less invasive to the end customer.

The monitor 60 is useful also, in finding a suitable location for the base unit 12 in the house. It is important to find a location in the house where the signal from the tank transmitter 11 is strong. In the case of multiple transmitters 11, all of the transmitters' 11 signals should be strong. The installer can walk from location to location in the house and view the quality of the RSSI value. When a location is found with good signals, that location would be suitable for the base unit 12. The same thing can be done with the base unit 12, but it is less convenient, as it requires AC power to receive a signal to view it's RSSI.

The monitor 60 also provides several benefits to delivery personnel. The monitor 60 will show the tanks 14 that it has heard from in the tank list. In the list of tanks is the Time Since the Last Transmission (TLST). When a fill is started, the tank transmitter 11 automatically increases its transmission rate. Each time a transmission is received from a tank 14 already in the list, the TLST is reset to zero and begins counting up again. Along with the serial number of the tank transmitter 11, this will indicate to the delivery person which tank 14 is being filled. The tank list is constantly being sorted by TSLT, so the tank 14 that has been heard from last will be at the top of the list. A user selectable "Auto Fill Mode" function exists that will automatically determine if one of the tanks 14 in the tank list is being filled. When it is determined that a tank 14 is being filled, the monitor 60 will automatically lock on to that tank 14 and switch to the fill mode screen. During a fill, the progress of the fill can be remotely monitored in the fill mode screen.

6. Installation and Operation

Overview

In the embodiments shown above, after installation on a tank 14, the transmitter 11 monitors the tank 14 level. As the fuel level in the tank 14 changes it is transmitted to the base unit 12 for display and processing. Tank 14 low and critical thresholds are entered on the host 13 computer for each tank 14. When the tank 14 level drops below either the low or critical threshold, a report will automatically be sent to the host 13 computer notifying the supplier of the event. A base unit 12 can support up to six individual tank transmitters 11 at the same time. Tank transmitters 11 may be field programmed as tank 14 1 through 6 (the default is tank 1). The base unit 12 does not interfere with the customer's telephone line 18 but does require the connection to report into the host 13 computer. If the phone line 18 is already in use, the base unit 12 will retry later. If someone, or another device, interrupts a base unit 12 during its report, the base unit 12 will immediately hang up and try again in about two minutes. After four attempts, it will wait 6 hours and then try to call a secondary host 13 phone number. Base unit 12 reports are usually made to a local or to a toll-free number to the host 13 computer. The base unit 12 is normally positioned within 500 feet of the tank 14, but ranges up to 1,000 feet are possible if line of sight transmission is available. The base unit 12 has a two-digit display that shows the latest level percentage (for up to 6 tanks 14). The base unit 12 will report in, using a telephone line 18, on a schedule that is downloaded from the host 13 computer. Report schedules may be hourly, daily, or weekly. The base unit 12 will also report in if there is a tank 14 fill, low level, critical level, or decompression event.

Operation of the Base Unit

When the base unit 12 is first powered on, all of the display 41 segments, icons, and LEDs will be illuminated. This is done to ensure all display 41 components are working properly. After a power outage, it will return to the last display 41 mode.

The base unit 12 has three pushbutton switches on the top:

a. The single button on the left-hand side is the MODE button 55.

b. The center button is the DOWN arrow 56.

c. The right-hand button is the UP arrow 57.

The base unit 12 display 41 will show tank 14 level percentage (for up to six tanks), time of day, and indoor temperature. Pressing the Mode button 55 will select one of the following three display 41 modes:

A. Tank Level Display

Figure 13:
FIGS. 13 *a-g* show various states of the base unit display.
Figure 13:
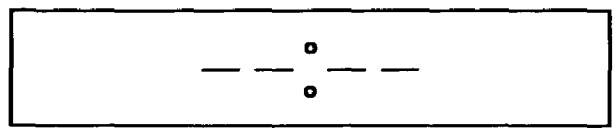
Figure 13:
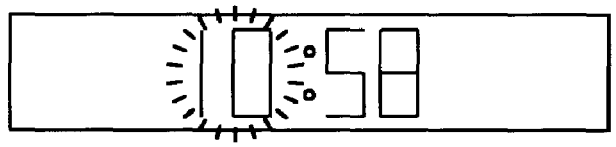
Figure 13:
Figure 13:
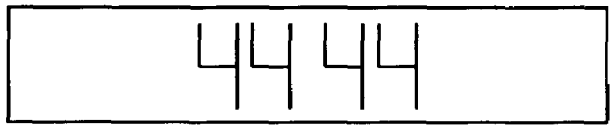
Figure 13:
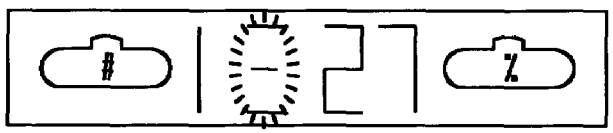
Figure 13:
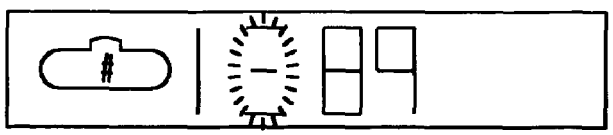
Figure 14:
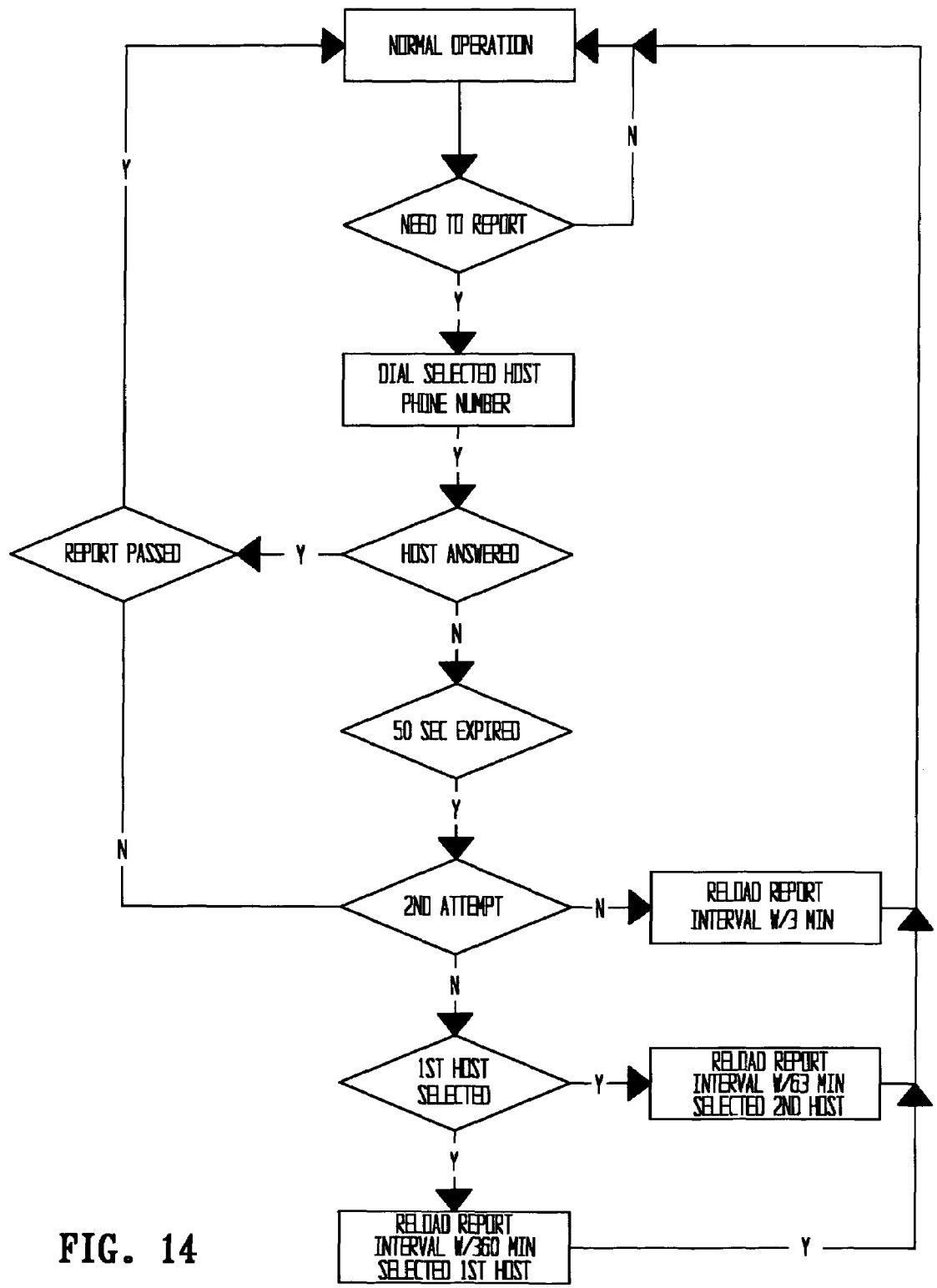
FIG. 14 is a flowchart illustrating the report fail and retry process of the present invention.

Referring to FIG. 13a, this mode is indicated by the illumination of the tank 14 icons located on the left and right sides of the display 41. The number on the left is the tank number, and the number on the right is the tank 14 level percentage. If more than one tank 14 is being monitored, the UP 56 and DOWN 57 arrow buttons may be used to scroll through the tank list. Always keep track of the number (1-6) that each tank 14 is reporting under.

Abnormal Display Explanations

Both the tank number and level are displayed as dashes. This indicates that no tanks 14 are initialized to this base unit 12.

The tank level is displayed as dashes. This is displayed after the base unit 12 has lost power. The level will be updated within four hours when the base unit 12 receives new information from the tank transmitter 11.

The tank level is displayed as flashing dashes. The base unit 12 has not received any new information from the tank transmitter 11 within the timeframe specified.

A reading of 50% is normal for a tank transmitter 11 that is NOT connected to a gauge.

B. Time Display

Referring to FIG. 13b, this mode is indicated by the illumination of the clock colon in the center of the display 41 window.

Abnormal Display Explanations

Both the hour and minutes are displayed as dashes. This is displayed after the base unit has lost power. The time will be automatically updated when the base unit reports the tank 14 level to the host 13 computer, or the time may be set manually by using the following instructions:

Setting the Time a. Referring to FIG. 13c, while in Time Display mode, press and hold the MODE button 55 for approximately two seconds.

b. Once the HOURS start to flash, release the MODE button 55 and use the UP/DOWN arrow buttons 56/57 to adjust the HOURS.

c. Press and release the MODE button 55 to advance to the MINUTES position.

d. Once the MINUTES start to flash, use the UP/DOWN arrow buttons 56/57 to adjust the MINUTES.

e. Press and release the MODE button 55 to advance to the AUTOUPDATE (AU) option. AUTO-UPDATE (AU) is a feature that allows the base unit 12 to automatically set its clock when it sends your tank 14 level to your propane supplier. You may want to disable this feature if you have set the base unit 12 to a time different than that provided by your propane supplier.

f. With AU displayed on the left, use the UP/DOWN arrow buttons 56/57 to select YS to enable this feature or NO to disable it.

g. Press and release the MODE button 55 to return to the Time Display.

While setting the time, if no buttons are pressed for 30 seconds, the base unit 12 will automatically return to the time display. Time zone offsets are controlled by host 13 software for each base unit 12.

C. Temperature Display

Referring to FIG. 13d, this mode is indicated by the illumination of an "F" or "C" in the right side of the display window. The UP/DOWN arrow buttons 56/57 can be used to toggle the display between Fahrenheit (F) and Celsius (C).

Abnormal Display Explanations

A flashing 99 is displayed when the temperature exceeds 99° F. in Fahrenheit mode, or 99° C. in Celsius mode.

A flashing 00 is displayed when the temperature has dropped below 0° F. in Fahrenheit mode, or 0° C. in Celsius mode.

To provide the most accurate temperature reading, do not place the base unit 12 in direct sunlight or near a heating or cooling source.

Brightness Adjustment

Referring to FIG. 13e, while displaying the temperature, pressing and holding the MODE button 55 for two seconds will show the current display brightness level. Pressing the UP or DOWN arrow buttons 56/57 will select one of the eight brightness levels. Pressing the MODE button 55 briefly will return to the Temperature Display.

While setting the brightness, if no buttons are pressed for 30 seconds, the base unit 12 will automatically return to Temperature Display.

Transmitter Installation a. Program Tank Number 2-6. Tank transmitters 11 have a default setting of Tank #1. If any other tank number is to be installed, the transmitter's 11 tank number must be changed by performing the following steps:
  i. Place one programming magnet 24 in the OFF 51 position.
  ii. Place an additional programming magnet 24 in the INIT 52 position.
  iii. Observe the programming transmissions on either a base unit 12 in PROGRAM mode or on a Transmitter Monitor.
  iv. Pay close attention to the transmitter's 11 tank 14 and serial numbers.
  v. Once the desired tank number is observed, remove one of the programming magnets 24 immediately.

This operation can be performed in the field or at your office prior to installation. The transmitters 11 should be tagged as "Tank 2-6" to keep them in order. Transmitter 11 initialization with the intended base unit 12 should still be performed in the field.

b. Ensure that you have the proper Rochester dial Interface 21 for the tank's gauge head 22 mechanism. Note the current tank percent reading in your notebook, or in the space provided in this guide.

c. Replace the old dial as necessary with one having a receptacle for the remote measurement sensor.

d. Record the new gauge reading in your notebook. Place the transmitter 11 near the tank's 14 dial face and snap the sensor into the dial lens. Secure the sensor cable to the tank 14 using nylon tie wraps.

e. After a transmitter 11 is connected to the tank dial, the programming magnet 24 on the top of the case must be moved from the OFF 51 position to the INIT 52 (initialize) position. It will transmit INIT 52 packets in 15-second intervals for 30 minutes. After 30 minutes, the transmitter 11 will automatically enter normal operating mode. At this time, the base unit 12 should be installed for the customer. This should be within transmitter 11 range and preferably not in a metal-clad building.

If it is necessary to turn the transmitter 11 off for storage or shipping, move the programming magnet 24 into the "OFF" 51 position and tape into place.

Base Unit Installation

Installation Menu

To enter the Installation Menu the base unit 12 must be in Tank Level Display mode. Press and hold the MODE button 55, while holding down the MODE button 55, press and hold BOTH the UP and DOWN arrow buttons 56/57 until "1 IN" is displayed. There are four sections of the Installation Menu that can be selected by pressing the UP or DOWN arrow buttons 56/57:

"1 IN"—Initialization: Look for tank transmitters
  "2 CN"—Configuration: Call host to configure Base Unit
  "3 SC"—Service Call: Base Unit test call to the host
  "4 PG"—Program: Used while programming transmitter tank #

To select a menu item press and release the MODE button 55. To exit the menu at any time, press and hold the MODE button 55 for one second.

Installation a. Check that there is a WORKING telephone RJ-11 jack and 110VAC outlet in the selected base unit 12 location. A touchtone telephone is required to complete the installation, but is not necessary for normal operation. If a customer's telephone is to be connected through the base unit 12, ensure that it works correctly prior to proceeding.

b. Connect the LINE jack on the back of the base unit 12 to the telephone wall jack, with the supplied telephone cord.

c. Connect the touchtone telephone, or craftsmen's handset, that will be used for configuration to the PHONE jack on the back of the base unit 12.

d. Plug the AC adapter into a 110-Volt outlet and the round L-shaped power plug into the 9VDC receptacle of the base 12. The base unit 12 should power up and be in Tank Level Display Mode.

e. Confirm that you have dial tone. Lift up the receiver of the telephone connected to the PHONE jack on the back of the base unit 12 to ensure proper operation.

Initialization a. Referring to FIG. 13f, enter the Installation Menu, as described at the beginning of the base unit 12 installation, and select "1 IN", INITIALIZATION Mode. The base unit 12 should display "1 IN"—(Option 1=Initialization). Press the MODE button 55 to display a column of flashing dashes. The base unit 12 will now accept transmissions from any tank transmitter 11 that is in INITIALIZATION mode, and will display the tank number and level percentage. Transmissions from any other tank transmitters 11 will not be displayed while in this mode.

b. When the base unit 12 receives any transmitter's 11 initialization packet, it will record its unique transmitter serial number along with its tank number. The base unit 12 should show the tank 14 number (1-6) and the level percentage in that tank 14. Confirm the level percentage is the same as recorded earlier from the tank gauge (+/−2% is acceptable).

c. On completion of INITIALIZATION, the base unit 12 will accept transmissions only from tank transmitters 11 that have been initialized to it.

d. Referring also to FIG. 13g, signal Strength: While in INITIALIZATION Mode, momentarily press the MODE button 55 to display Received Signal Strength Indication (RSSI). Signal strength will be displayed as a number from 00 to 99 for any transmitter 11 in INITIALIZATION mode and within range of the base unit 12. The higher the number, the stronger the signal from the tank transmitter 11.

e. Position the base unit 12, and its antenna 30 for optimal reception. Observe the RSSI level for the highest possible signal strength.

f. Press and hold the base unit 12 MODE button 55 for one second to return to Tank Level Display mode.

The displayed tank level or signal strength will be updated every 15 seconds while the transmitter 11 is in INITIALIZATION Mode. The base unit 12 will return to Tank Level Display if it has not received any tank transmitter 11 initialization packets within 10 minutes.

Configuration a. Enter the Installation Menu, as described at the beginning of the base unit 12 installation, and select "2 CN", to enter CONFIGURATION Mode (CN FG). CONFIGURATION Mode allows the installer to manually call the host 13 where the base unit 12 will report and receive its alarm thresholds and report interval. The number of tanks 14 initialized must agree with the configuration data that will be downloaded from the host 13. The installer will normally use a touchtone telephone from his or her toolkit or the customer's telephone.

If no phone connection is available, the base unit 12 will scroll "NO LINE" across its display 41 several times, then return to Tank Level Display. If the phone is in use, the base unit 12 will scroll "IN USE" across its display 41 several times, then return to Tank Level Display.

b. Using a touch-tone telephone, dial the host phone number and listen for voice instructions while the base unit 12 displays "DIAL":

"Please enter the Base ID now . . . "

The base unit 12 will now scroll "CNFG" across its display 41 until the configuration process is complete. Usually the Base ID will be some form of the phone number and extension of the installation site. The host 13 computer and the base unit 12 will communicate for approximately 30 seconds.

c. A successful configuration will be indicated by a voice message on the phone handset, and also by the base unit 12 showing "PASS" on its display 41.

d. An unsuccessful configuration will be indicated by a voice message on the phone handset, and also by the base unit 12 showing "FAIL" on its display 41.

e. Reasons for failure may be a poor quality handset, entering the wrong Base ID number, or poor line quality.

Service a. Enter the Installation Menu, as described at the beginning of the base unit 12 installation section, and select "3 SC" to activate a SERVICE CALL. If no phone connection is available, the base unit 12 will scroll "NO LINE" across its display 41 several times, then return to Tank Level Display. If the phone is in use, the base unit 12 will scroll "IN USE" across its display 41 several times, then return to Tank Level Display. If the base unit 12 has not been configured, the base unit 12 will scroll "NO CNFG" across its display 41 several times, then return to Tank Level Display.

b. The base unit 12 will now scroll "CALL" across its display 41. During this time the base unit 12 will attempt to call the host 13 computer. Upon connection to the host 13, an exchange of information will occur. Observe the base unit 12 for a display of "PASS" or "FAIL". On completion of a successful SERVICE CALL, the base unit 12 is ready for service.

Although the apparatus and method of the invention have been described in connection with field of tank management, particularly propane tank or LP fuel management, it can readily be appreciated that it is not limited solely to such field, and can be used in other fields such as other fuel tanks such as gasoline, oil or the like, water tanks, anhydrous ammonia or other fertilizer tanks, other chemical tanks, various other gas or liquid tanks or containers, feed tanks, waste storage tanks, and various other solid material tanks and containers.

The descriptions above and the accompanying drawings should be interpreted in the illustrative and not the limited sense. While the invention has been disclosed in connection with an embodiment or embodiments thereof, it should be understood by those skilled in the art that there may be other embodiments which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. An apparatus for monitoring the fluid fill level in a tank of the type having a fill level gauge with a rotatable magnet in a gauge head, comprising:
   (a) a transmission unit adapted to be disposed on or near the tank, the transmitter being constructed and arranged to detect at least the fill level of the tank and send information related to the detected fill level, the transmission unit comprising a Hall effect sensor which mates with the head of the tank fill level gauge and tracks the rotational position of the magnet in the gauge head;
   (b) a base unit adapted to be disposed at a predetermined location remote from the tank, the base unit being constructed and arranged to receive information related to the detected fill level from the transmission unit; and
   (c) a host unit adapted to be disposed at a location remote from the base unit and the transmission unit, the host unit being constructed and arranged to receive information related to the detected fill level from the base unit.

2. The apparatus of claim 1, wherein the tank consisting of the group of tanks consisting of fuel tank, water tank, air tank, vapor tank, chemical tank, and feed tank.

3. The apparatus of claim 2, wherein the fuel tank is a propane tank.

4. The apparatus of claim 1, wherein the transmission unit further comprises a battery power supply, a controller connected to the power supply and to the sensor, the controller including a power management system for sending information to the base unit only when predetermined changes in the article or system being monitored occur or when predetermined environmental factors are sensed, and a radio frequency transmission send element connected to the controller.

5. The apparatus of claim 4, further comprising a sensor selected from the group of sensors consisting of a temperature sensor and a clock.

6. The apparatus of claim 1, wherein the base unit comprises a power supply, a controller connected to the power supply, a transmission receive element connected to the controller for receiving information from the transmission unit, and a telephone line interface connected to the controller and adapted for connection to a telephone line for sending and receiving information to and from the host unit.

7. The apparatus of claim 6 wherein the base unit further comprises a display connected to the controller for displaying information pertaining to the article or system being monitored.

8. The apparatus of claim 6, wherein the base unit further comprises a sensor selected from the group of sensors consisting of a temperature sensor, a power supply sensor, and a clock.

9. The apparatus of claim 6, wherein the power supply comprises an AC to DC power adapter.

10. The apparatus of claim 6, wherein the controller includes non-volatile memory for storing configuration information sent to the base unit from the host unit.

11. The apparatus of claim 6, wherein the transmission receive element is an RF receiver.

12. The apparatus of claim 6, wherein the display provides a large, wide angle viewing perspective.

13. The apparatus of claim 6, wherein the controller has a monitor mode which waits for, receives and stores information from the transmission unit, and a report mode wherein stored information received from the transmission unit is sent to the host unit via the telephone interface.

14. The apparatus of claim 1, wherein the base unit reports data to the host unit independent of the presence of external, non-telephone line power.

15. The apparatus of claim 1, wherein the host unit comprises a computer, a telephone line interface connected to the computer and adapted for connection to a telephone line; and software resident in the computer for managing information related to the detected parameter.

16. An apparatus for monitoring and managing the fill level of a propane or LP fuel tank of the type having a fill level gauge with a rotatable magnet in a gauge head, comprising:
   (a) a transmission unit adapted to be disposed on the fuel tank, the transmitter being constructed and arranged to detect at least the fill level of the fuel tank and send information related to the detected fill level, the transmission unit including:
   (i) a battery power supply,
   (ii) a controller connected to the power supply, the controller including a power management system for sending information to the base unit only when predetermined changes in the fuel tank being monitored occur or when predetermined environmental factors are sensed,
   (iii) a sensor connected to the controller and communicatively coupled to the fuel tank being monitored, the sensor being comprising a Hall effect sensor which mates with the head of the tank fill level gauge and tracks the rotational position of the magnet in the gauge head, and
   (iv) a radio frequency transmission send element connected to the controller;
   (b) a base unit adapted to be disposed at a predetermined location remote from the fuel tank, the base unit being constructed and arranged to receive information related to the detected fill level from the transmission unit, the base unit including:
   (i) a power supply,
   (ii) a controller connected to the power supply,
   (iii) a radio frequency transmission receive element connected to the controller for receiving information from the transmission unit,
   (iv) a telephone line interface connected to the controller and adapted for connection to a telephone line for sending and receiving information to and from the host unit,
   (v) a sensor connected to the controller, and
   (vi) a display connected to the controller for displaying information pertaining to the fuel tank being monitored; and
   (c) a host unit adapted to be disposed at a location remote from the base unit and the transmission unit, the host unit being constructed and arranged to receive information related to the detected parameter from the base unit, the host unit including:
   (i) a computer,
   (ii) a telephone line interface connected to the computer and adapted for connection to a telephone line; and
   (iii) software resident in the computer for managing information related to the detected parameter.

17. A method of monitoring the fluid fill level in a tank of the type having a fill level gauge with a rotatable magnet in a gauge head, comprising the steps of:
   (a) detecting at least the fill level related to the tank at the location of the tank, the detecting comprising the steps of mating a Hall effect sensor with the head of the tank fill level gauge and tracking the rotational position of the magnet in the gauge head via the sensor;
   (b) sending information related to the detected parameter to a predetermined first location remote from the tank, and
   (c) sending the information related to the detected fill level from the first remote location to a second location remote from the tank and from the first remote location.

18. The method of claim 17, wherein the method monitors the fill level of a fuel tank.

19. The method of claim 18, wherein the fuel tank is a propane tank.

20. A method of monitoring a fill level of a propane or LP fuel tank of the type having a fill level gauge with a rotatable magnet in a gauge head, comprising the steps of:
   (a) detecting at least the fill level related to the tank at the location of the tanks, the detecting step including the sub-steps of:
   (i) mating a battery powered Hall effect sensor with the head of the tank fill level gauge, and
   (ii) tracking the rotational position of the magnet in the gauge head via the sensor;
   (b) sending information related to the detected fill level to a predetermined base location remote from the tank via radio frequency transmission,
   (c) receiving via radio transmission, storing and displaying the sent information related to the detected fill level at the base location;
   (d) sending the stored information related to the detected fill level from the base location to a host location remote from the tank and from the base location via a telephone link;
   (e) receiving, via the telephone link, the sent information related to the detected fill level at the host location; and
   (f) storing and processing the information related to the detected fill level at the host location.

* * * * *